United States Patent
Nakahara et al.

(10) Patent No.: US 9,953,249 B2
(45) Date of Patent: Apr. 24, 2018

(54) METHOD AND SYSTEM FOR GENERATING A DRAWING ORDER LIST FOR MULTIPLE DRAWING OBJECTS BASED ON SCANLINES

(71) Applicant: KYOCERA Document Solutions Inc., Osaka (JP)

(72) Inventors: Hideo Nakahara, Torrance, CA (US); Xuqiang Bai, Rancho Palos Verdes, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/072,049

(22) Filed: Mar. 16, 2016

(65) Prior Publication Data
US 2017/0270392 A1    Sep. 21, 2017

(51) Int. Cl.
*G06K 15/00* (2006.01)
*G06K 15/02* (2006.01)

(52) U.S. Cl.
CPC ..... *G06K 15/1802* (2013.01); *G06K 15/1809* (2013.01); *G06K 15/1813* (2013.01)

(58) Field of Classification Search
None
See application file for complete search history.

(56) References Cited

U.S. PATENT DOCUMENTS

| | | | | |
|---|---|---|---|---|
| 5,600,768 | A | * 2/1997 | Andresen | G06T 11/60 345/629 |
| 5,946,451 | A | * 8/1999 | Soker | G06K 15/02 358/1.15 |
| 6,330,072 | B1 | * 12/2001 | Barada | G06K 15/02 345/629 |
| 2006/0203011 | A1 | * 9/2006 | Kobayashi | G06T 11/40 345/629 |

(Continued)

FOREIGN PATENT DOCUMENTS

| | | |
|---|---|---|
| JP | 2010-074262 A | 4/2010 |
| JP | 2011-079158 A | 4/2011 |
| JP | 2013-052615 A | 3/2013 |

OTHER PUBLICATIONS

Hewlett Packard, "PCL XL Feature Reference Protocol Class 2.0," available at http://www.undocprint.org/_media/formats/page_description_languages/pcl_xl_2_0_technical_reference_rev2_2.pdf, Revision p2.2, Mar. 16, 2000.

*Primary Examiner* — Barbara Reiner
(74) *Attorney, Agent, or Firm* — McDonnell Boehnen Hulbert & Berghoff LLP

(57) ABSTRACT

A method and system for generating drawing orders are provided. The method involves receiving print data including data representing a plurality of drawing objects including at least a first drawing object and a second drawing object. The first drawing object and the second drawing object are each of one of predetermined object types and meet a predetermined condition. The method further (Continued)

involves (i) rendering the first drawing object to a first plurality of scanlines, (ii) rendering the second drawing object to a second plurality of scanlines, and (iii) generating, at the same time, a drawing order list for the first and second drawing objects based on the first and second plurality of scanlines.

21 Claims, 24 Drawing Sheets

(56) References Cited

U.S. PATENT DOCUMENTS

2009/0185222 A1* 7/2009 Foehr ...................... G06F 3/122
 358/1.15
2010/0302564 A1* 12/2010 Ozawa ............... G06K 15/1849
 358/1.9

* cited by examiner

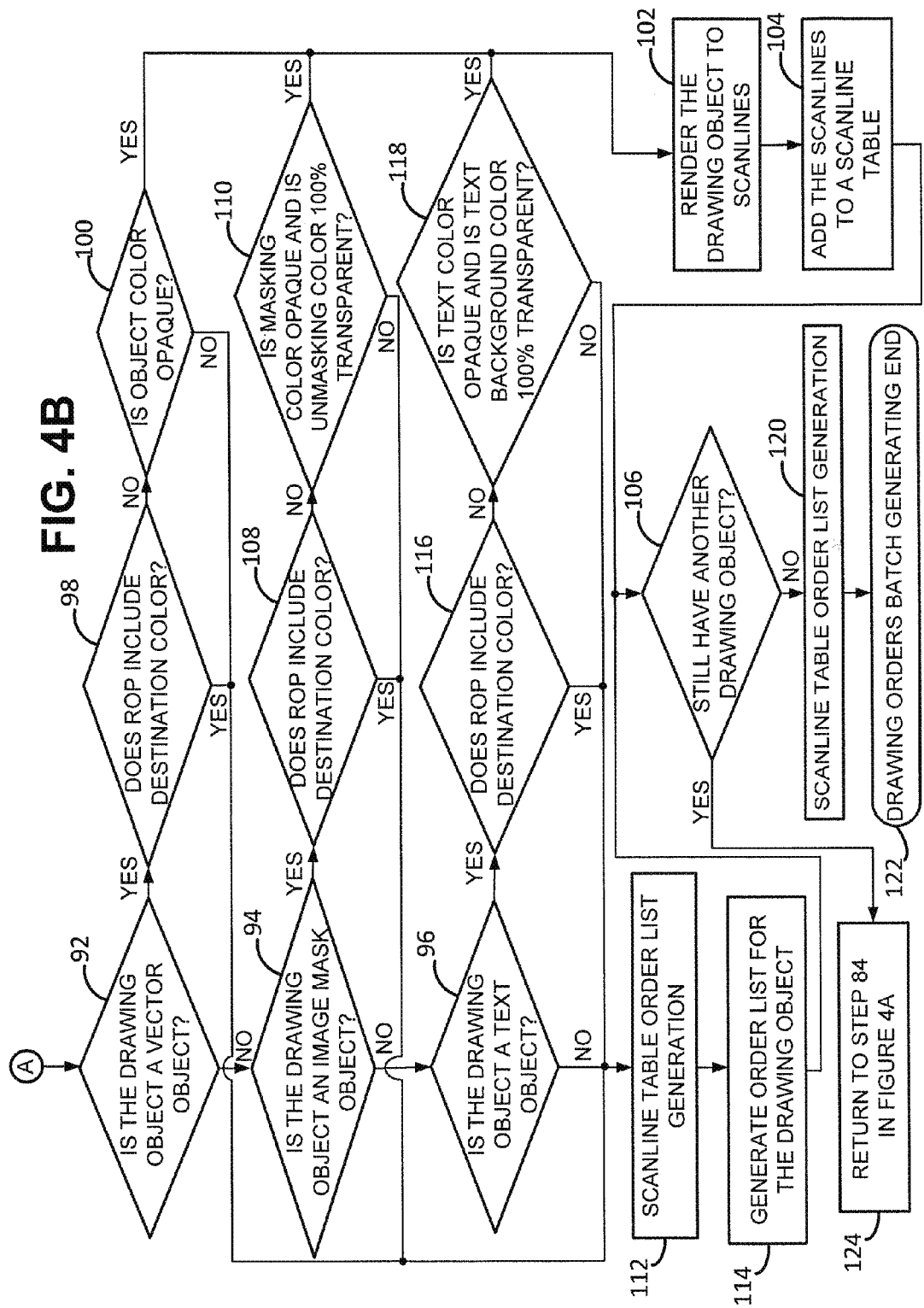

METHOD AND SYSTEM FOR GENERATING A DRAWING ORDER LIST FOR MULTIPLE DRAWING OBJECTS BASED ON SCANLINES

BACKGROUND

In general, page description language (PDL) is a language that describes an appearance/layout of a printed page, and data in a PDL print job may define various types of drawing objects, such as vector, text and raster objects. In order to draw, for example, objects defined in a vector format (or vector objects), colors for drawing an outline of an object and a color for filling the inside of the object may be defined. Some PDL protocols may refer to those colors as pen and brush colors, respectively. After defining pen and brush colors, orders, or commands, to draw PDL objects are typically repeatedly executed for each individual drawing object.

Often, however, drawing multiple vector objects does not require changing pen and brush colors. Nevertheless, a traditional method involves generating a list of drawing orders for every single vector object. However, this traditional method will typically slow down printing time if many such vector objects are included in a print job.

Hence, a need exists for improving printing time of multiple drawing objects sharing same characteristics.

SUMMARY

In light of the above, as a general matter, the present disclosure provides a way to improve printing performance by collecting incoming drawing objects meeting certain criteria, and generating a drawing order list once for the multiple drawing objects instead of doing so multiple times. As a result, the time of order list generation may be reduced, and hence printing time may be improved.

More specifically, in one aspect, a disclosed method comprises: (i) receiving, by at least one processor, print data including data representing a plurality of drawing objects including at least a first drawing object and a second drawing object, wherein the first drawing object and the second drawing object are each of one of predetermined object types and meet a predetermined condition, (ii) rendering, by the at least one processor, the first drawing object to a first plurality of scanlines, (iii) rendering, by the at least one processor, the second drawing object to a second plurality of scanlines, and (iv) generating, by the at least one processor, at the same time, a drawing order list for the first and second drawing objects based on the first and second plurality of scanlines.

In one or more embodiments, the disclosed method may further comprise (i) adding, by the at least one processor, the first plurality of scanlines to a scanline table, and (ii) adding, by the at least one processor, the second plurality of scanlines to the scanline table, wherein adding the second plurality of scanlines to the scanline table includes merging the second plurality of scanlines with the first plurality of scanlines in the scanline table.

These as well as other aspects, advantages, and alternatives will become apparent to those of ordinary skill in the art by reading the following detailed description with reference where appropriate to the accompanying drawings.

BRIEF DESCRIPTION OF THE DRAWINGS

FIG. 4B is a flowchart depicting a process that is a continuation of the process of FIG. 4A;

DETAILED DESCRIPTION

In the following detailed description, reference is made to the accompanying figures, which form a part hereof. In the figures, similar symbols typically identify similar components, unless context dictates otherwise. The example embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

1. Example Apparatus

Figure 1:
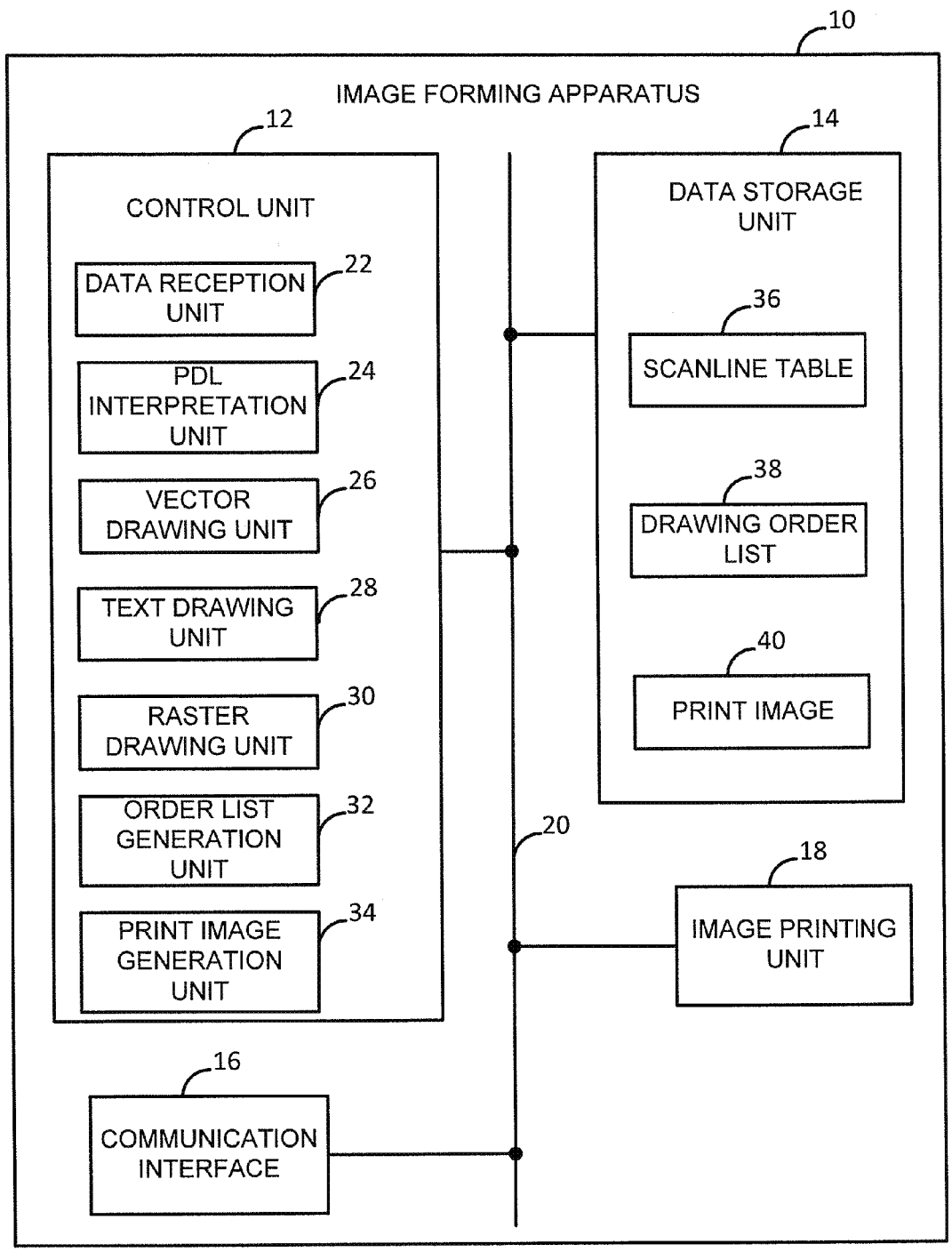
FIG. 1 illustrates one configuration of an image forming apparatus in which an example embodiment of the present disclosure may be employed.

FIG. 1 illustrates one configuration of an image forming apparatus 10 in which an example embodiment of the present disclosure may be employed.

As illustrated in FIG. 1, the image forming apparatus 10 includes a control unit 12, a data storage unit 14, a communication interface 16, and an image printing unit 18, all connected together via a system bus or other mechanism 20. The control unit 12 further includes a number of units including a data reception unit 22, a PDL interpretation unit 24, a vector drawing unit 26, a text drawing unit 28, a raster drawing unit 30, an order list generation unit 32, and a print image generation unit 34. The data storage unit 14 may include a number of storage areas (e.g., one or more data buffers) corresponding to a scanline table 36, a drawing order list 38, and a print image 40. In this regard, the scanline table 36 may include scanline data associated with one or more drawing objects, the drawing order list 38 may include data representing a drawing order list generated by the order list generation unit 32, and the print image 40 may include image data generated by the print image generation unit 34.

However, it should be understood that this system arrangement is shown for purpose of example only, and the image forming apparatus 10 may also include other components not shown in FIG. 1. For example, the data storage unit 14 may also include storage area(s) for storing incoming print data received by the communication interface 16 from an external device, such as a host computer. As another example, the control unit 12 may include a raster image processor (RIP) that can transform/convert vector digital information into a raster (or pixel) format, such as in accordance with command(s) in PDL data.

In general, the control unit 12 may comprise one or more central processing units (CPUs), general purpose processors, and/or dedicated processors (e.g., application specific integrated circuits (ASICs) or digital signal processors (DSPs)). The data storage unit 14 may be one or more non-transitory computer-readable media, and can be a volatile and/or nonvolatile type of data storage. In general, in addition to the scanline table 36, the order list 38, and the print image 40, the data storage unit 14 may store various program logic including program instructions (e.g., machine language instructions or any other higher-level programming instructions) executable by the control unit 22 to carry out various functions described herein. The data storage unit 14 can also store other data used by such program logic.

Within the control unit 12, the data reception unit 22 may be configured to receive incoming print data from the communication interface 16. In this regard, the incoming print data received by the communication interface 16 may be in the form of any suitable page description language (PDL). The PDL interpretation unit 24 may, in turn, be configured to interpret the PDL print data and pass different types of drawing objects included in the PDL print data for further processing by the units 26-30.

Namely, the vector drawing unit 26 may be configured to process vector objects, the text drawing unit 28 may be configured to process text objects, and the raster drawing unit 30 may be configured to process raster objects. In this regard, the vector drawing unit 26 may be configured to generate scanlines associated with a vector object for storage in the scanline table 36. The vector drawing unit 26 may further be configured to generate scanlines associated with other types of drawing objects, such as a text object and an image mask object, for storage in the scanline table 36 once the text object and the image mask object are processed and converted to a vector format.

The order list generation unit 32 may be configured to generate the drawing order list 38 for drawing objects processed by the units 26-30. Further, the print image generation unit 34 may produce the print image 40 in accordance with the drawing order list 38 to be printed by the image printing unit 18. Each of the units 22-34 may be a logical unit implemented in software executed by the control unit 12 or may be a dedicated processing unit (e.g., an ASIC).

2. Example Operation

Figure 2:
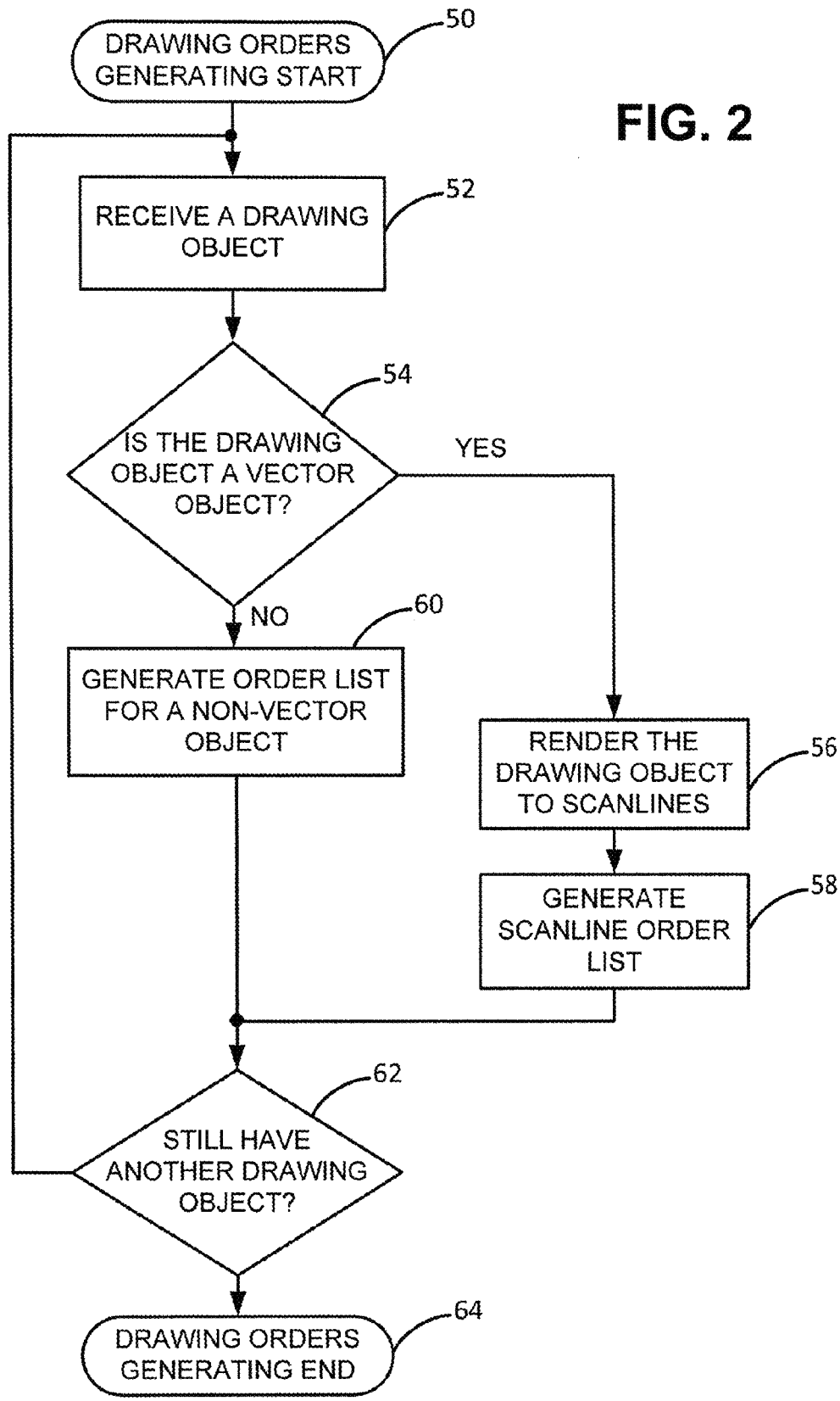
FIG. 2 is a flow chart depicting an example of a related art method of generating a drawing order list for a vector object.

As noted above, traditional ways of drawing objects, such as vector objects, may be time consuming since a drawing order list is typically generated for each individual vector object, regardless of whether the vector objects have, e.g., the same pen and brush colors. FIG. 2 illustrates an example of a related art method of generating a drawing order list for a vector object.

As shown in FIG. 2, at step 50, drawing orders generating starts. At step 52, a drawing object is received. Then, at step 54, a determination is made as to whether the drawing object is a vector object. If the drawing object is a vector object, at step 56, the drawing object is rendered to scanlines, and, at step 58, an order list based on the scanlines (or "scanline order list") is generated. If the drawing object is not a vector object, at step 60, an order list for a non-vector object is generated. Then, at step 62, a determination is made as to whether there is still another drawing object to process. At step 64, the drawing orders generating ends.

Hence, in accordance with the related process, a drawing order list for drawing multiple vector objects is generated individually for each vector object. Such a process slows down the printing speed of multiple drawing objects that may otherwise be similar. The present disclosure provides a way to reduce the time of order list generation for drawing objects that are each of one of predetermined object types and meet a predetermined condition.

Figure 3:
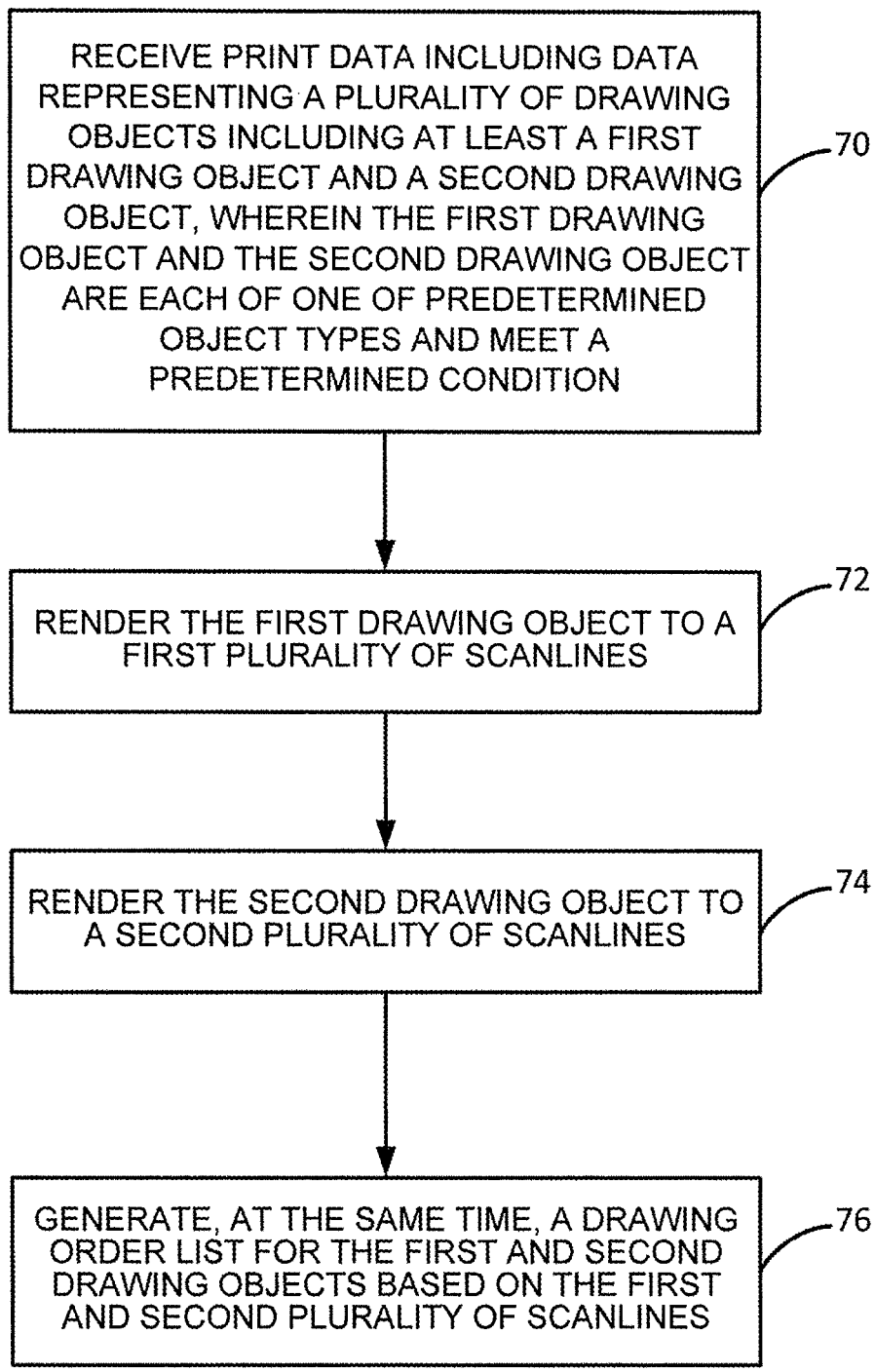
FIG. 3 is a flow chart summarizing a set of functions that can be carried out in the image forming apparatus of FIG. 1, in accordance with an example embodiment.

FIG. 3 is a flow chart summarizing a set of functions that can be carried out in accordance with an example embodiment, such as by the control unit 12 in the arrangement of FIG. 1, for instance.

Step 70 involves receiving print data including data representing a plurality of drawing objects including at least a first drawing object and a second drawing object, wherein the first drawing object and the second drawing object are each of one of predetermined object types and meet a predetermined condition. Step 72 involves rendering the first drawing object to a first plurality of scanlines. Step 74 involves rendering the second drawing object to a second plurality of scanlines. Then, step 76 involves generating, at the same time, a drawing order list for the first and second drawing objects based on the first and second plurality of scanlines.

Note that, as generally used herein, the term "drawing order list" (or "order list," for short) refers to a list of drawing orders, or drawing commands, for forming a drawing object. Further, the term "render" (and grammatical variants thereof, such as "rendering," "rendered," etc.) generally refers to a process of converting an input object described by PDL data into a data format that an image forming apparatus can use to form an output image. Such process could include multiple stages, where a stage of converting the input object into an intermediate data format (e.g., into scanlines) may also be referred to as "rendering." Yet further, the term "scanline" is used herein to generally refer to a single line or row making up a drawing object.

In accordance with some embodiments, the predetermined object types may include a vector object, a text object, and an image mask object. In this regard, the first drawing object may be of a first object type and the second drawing object may be of a second object type different from the first object type.

As generally used herein, each of those predetermined objects types (i.e., a vector object, a text object, and an image mask object) may have drawing properties that include a foreground color, a background color, a transparency of the foreground color (referred to as "foreground color transparency"), and a transparency of the background color (referred to as "a background color transparency") associated with the object type. In case of vector objects, a color of a vector object (referred to as "object color") represents a foreground color of a vector object. The object color may include pen and brush colors. Further, it is assumed herein that, in the case of vector objects, a background color is not present or a background color is 100% transparent, and hence a background color transparency of the vector object is taken to be 100%. In case of text objects, a color of text (referred to as "text color") represents a foreground color of a text object, whereas a background color of text (referred to as "text background color") represents a background color of the text object. In case of image mask objects, a color of a masking area of an image mask object (referred to as "masking color") represents a foreground color of the image mask object. A color of an unmasking area of the image mask object (referred to as "unmasking color") represents a background color of the image mask object.

In this regard, as generally defined herein, the term "image mask object" refers to a bi-level (or binary) image in which each pixel is represented by a 1-bit value of either 0 or 1. As a general matter, a mask, such as a grayscale bitmap image for instance, may be applied to an original object to display or hide certain portions of that object. For example, some portions of the mask may render underlying portions of the original image fully transparent, thus masking out or erasing those portions. On the other hand, other portions of the mask may allow the underlying portions of the original object to remain fully visible, thus protecting or masking those portions.

Further, as generally used herein, the term "unmasking area" refers to an area of an image mask object that will at least partially allow a destination, or an output, color of an image to which the image mask object is applied to show through. For instance, if an unmasking color (or a background color of the image mask object) is 100% transparent, the destination color will fully show through. On the other hand, the term "masking area" refers to an area of an image mask object that is filled with a foreground color that corresponds to a color of object(s) in the image mask object used for masking.

Referring back to the process of FIG. 3, in some embodiments, the predetermined condition may hold at least that a first color of the first drawing object is the same as a second color of the second drawing object. In this regard, the predetermined condition may require that a first input color of the first drawing object is the same as a first destination color of the first drawing object, and a second input color of the second drawing object is the same as a second destination color of the second drawing object. Further, the first color of the first drawing object may include a first foreground color of the first drawing object and the second color of the second drawing object may include a second foreground color of the second drawing object.

Additionally, in some embodiments, if at least one of the first drawing object and the second drawing object is a vector object, then the predetermined condition may further hold that a color of the vector object is opaque (i.e., has no transparency associated with it, or in other words, is 0% transparent). Further, in some embodiments, if at least one of the first drawing object and the second drawing object is an image mask object, then the predetermined condition may further hold that a masking color of the image mask object is opaque and an unmasking color of the image mask object is 100% transparent. Yet further, if at least one of the first drawing object and the second drawing object is a text object, then, in some embodiments, the predetermined condition may further hold that a text color of the text object is opaque and a text background color of the text object is 100% transparent.

With a benefit of the present disclosure, multiple drawing objects that are each of one of predetermined object types and meet a predetermined condition can be continuously collected, and then a drawing order list may be generated at the same time for all of such drawing objects, instead of having to generate an individual drawing order list for each drawing object.

In this regard, the drawing order list may be in the form of a single block order, or one block of drawing orders, which is a combination of several drawing orders. Such block order may be generally produced by rendering each of the multiple drawing objects to respective scanlines, combining the scanlines for all of the multiple drawing objects (e.g., in the scanline table 36), and then generating drawing orders based on a combination of the scanlines associated with the multiple drawing objects. As such, image forming speed may be improved.

FIGS. 4A-4B and FIGS. 5-8 are additional flow charts depicting various processes that can be carried out in accordance with one or more example embodiments, such as by the control unit 12 of the image forming apparatus 10.

Figure 4A:
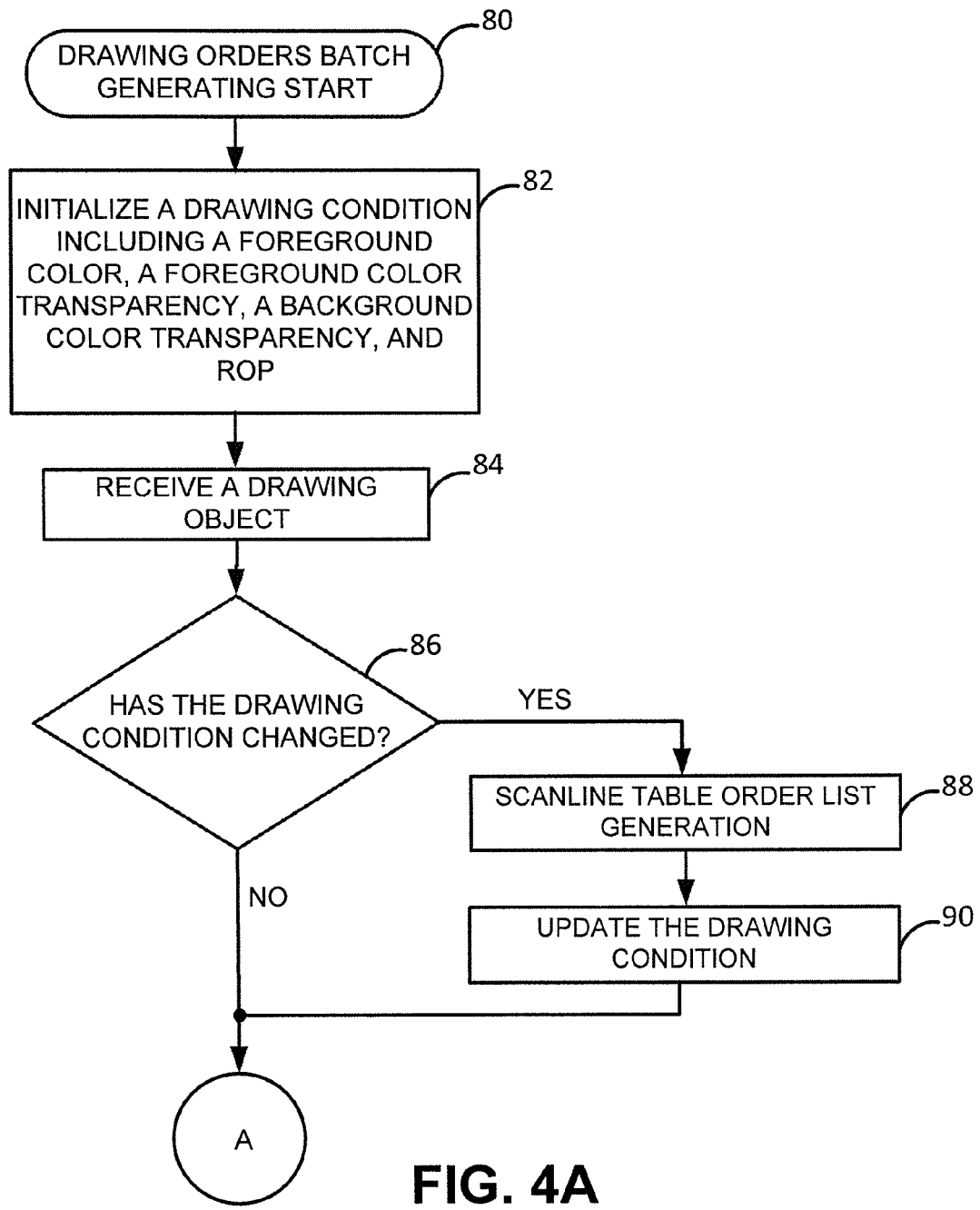
FIG. 4A is a flowchart depicting a top-level process for batch generating drawing orders, in accordance with an example embodiment.

FIG. 4A is a flowchart depicting a top-level process for generating drawing orders in a batch, or at the same time, for multiple drawing objects, in accordance with an example embodiment. At step 80, batch generating of drawing orders starts. At step 82, a drawing condition is initialized. The drawing condition may include drawing parameters such as a foreground color, a foreground color transparency, a background color transparency, and raster operations ("ROP"). In this regard, values associated with those parameters may be set to default values defined in an input print data. During a printing process, a user, for example, may modify properties of an output image to be printed and hence properties (e.g., color, transparency, etc.) of drawings objects making up the input image may change as well.

Note that, as used herein, the term "ROP" broadly refers to raster operations that perform bit-wise operation (e.g., AND, OR, XOR, etc.) on a number of operands to produce new destination, or output, image data. ROP may be specified to perform color blending and adding transparency to graphical objects. Hence, for example, the ROP can change an input color of a given drawing object to produce a new destination color.

At step 84, a drawing object is received. At step 86, a determination is made as to whether the drawing condition has changed. If the drawing object is a very first received drawing object in a sequence of drawing objects, then, at step 86, a foreground color, a foreground color transparency, a background color transparency, and ROP of the drawing object are compared with values of the corresponding parameters in the initialized drawing condition. In other cases, the determination at step 86 is made with respect to drawing condition parameters of a previously processed drawing object. For example, a foreground color, a foreground color transparency, a background color transparency, and ROP of the previously processed drawing object are compared with a foreground color, a foreground color transparency, a background color transparency, and ROP of the drawing object received.

Figure 5:
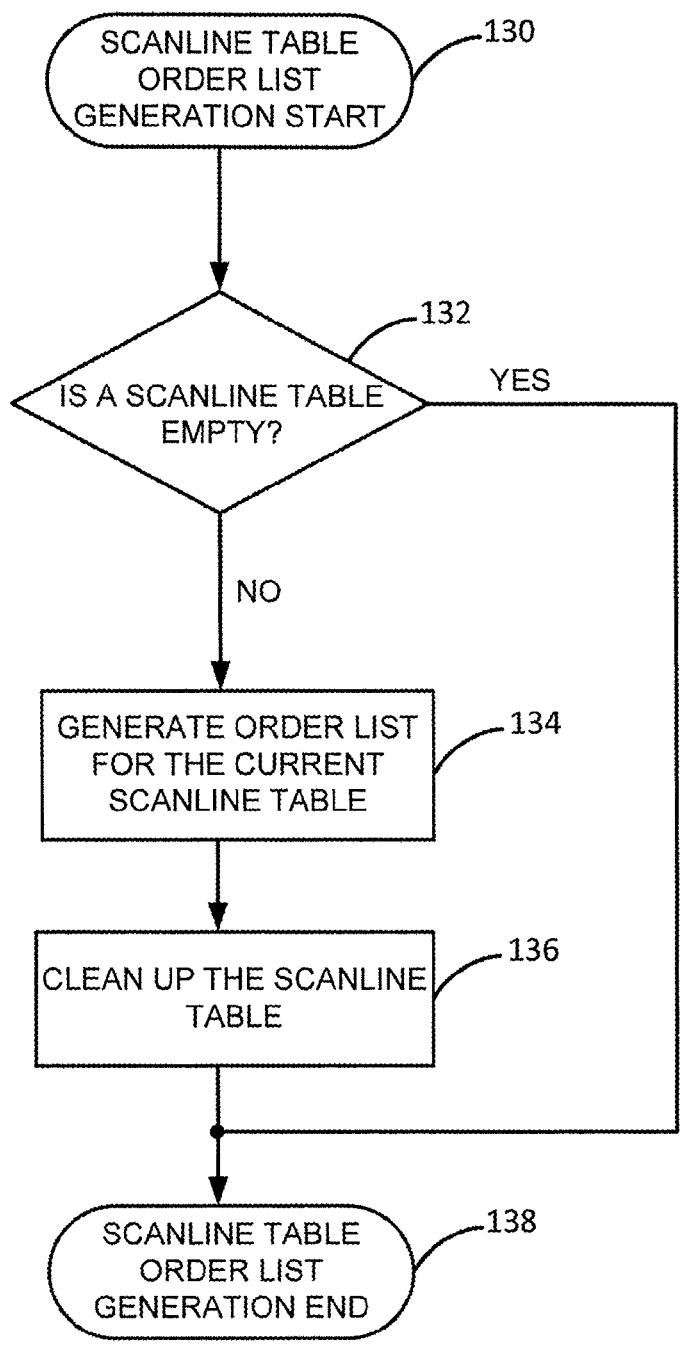
FIG. 5 is a flowchart depicting a process of scanline table order list generation, in accordance with an example embodiment.

If the drawing condition has changed, the flow moves to step 88 at which a process of scanline table order list generation, as shown in FIG. 5, is executed. At this step, any scanline data currently held in a scanline table may be processed to generate drawing orders. Then, at step 90, the drawing condition is updated to values associated with respective drawing parameters of the drawing object (e.g., a foreground color, a foreground color transparency, a background color transparency, and ROP).

If the drawing condition did not change, the flow continues to a process designated by "A" and shown in FIG. 4B. FIG. 4B is a flowchart depicting the process "A" that is a continuation of the process of FIG. 4B. As shown in FIG. 4B, steps 92, 94, and 96 involve determining if the drawing object is one of predetermined object types; namely, if it is a vector object, a text object, or an image mask. In particular, step 92 determines if the drawing object is a vector object. If the drawing object is a vector object, then, at step 98, a determination is made as to whether ROP associated with the drawing object includes a destination color, meaning that as the result of ROP, the destination color of the drawing object will be different from its original input color. If not, at step 100, a determination is made as to whether an object color (or a foreground color of a vector object) of the drawing object is opaque, meaning it has 0% transparency. Note that, as previously described above, it is assumed that a background color transparency of a vector object is 100%.

If, at step 98, the ROP associated with the vector object includes the destination color or if, at step 100, the object color of the vector object is not opaque, the flow moves to step 112 at which the process of scanline table order list generation, as shown in FIG. 5, is executed. Then, at step 114, an order list for the drawing object is generated, as shown, e.g., in FIG. 2. At step 106, a determination is made as to whether there is another incoming drawing object to process. If another incoming drawing object exists, at step 124, the flow returns to step 84 shown in FIG. 4A to receive a next incoming drawing object. If not, at step 120, the process of scanline table order list generation, as shown in FIG. 5, is executed, and the batch generating of drawing orders ends at step 122.

If, however, at step 100, the determination result is that the object color is opaque, then, at step 102, the drawing object is rendered to scanlines and the scanlines are added to a scanline table, such as the scanline table 36, at step 104. A process of adding object scanlines to the scanline table will be described in more detail in connection with FIG. 6.

If the determination result at step 92 is that the drawing object is not a vector object, then, at step 94, a determination is made as to whether the drawing object is an image mask object. If the drawing object is an image mask object, then the flow moves to step 108 at which a determination is made as to whether ROP associated with the drawing object includes a destination color, as described above.

If the ROP does not include a destination color, at step 110, a determination is made as to whether a masking color (or a foreground color of an image mask object) is opaque and whether an unmasking color is 100% transparent (or whether a background color transparency of an image mask object is 100%). If, however, the ROP includes the destination color or the conditions at step 110 are not met, the flow follows steps 112, 114, and 106, in that order, as described previously.

If the conditions at step 110 are met, the flow moves to steps 102 and 104 described previously. After step 104 is executed, the flow proceeds to step 106 to determine if another incoming drawing objects exists. If not, as previously described, at step 120, the process of scanline table order list generation (as shown in FIG. 5) is executed, and the batch generating of drawing orders ends at step 122. Otherwise, the flow returns to step 84 (step 124) to receive the next incoming drawing object.

If the determination result at step 94 is that the drawing object is not an image mask object, then, at step 96, a determination is made as to whether the drawing object is a text object. If the drawing object is not a text object, then the flow follows steps 112, 114, and 104, in that order, as described previously. If, however, the drawing object is a text object, then the flow moves to step 116 at which a determination is made as to whether ROP associated with the drawing object includes a destination color, as described above.

If the ROP does not include a destination color, at step 118, a determination is made as to whether a text color (or a foreground color of an text object) is opaque and whether text background color is 100% transparent (or whether a background color transparency of a text object is 100%). If, however, the ROP includes the destination color or the conditions at step 118 are not met, the flow follows steps 112, 114, and 106, in that order, as described previously.

If the conditions at step 118 are met, the flow moves to steps 102 and 104 described previously. After step 104 is executed, the flow proceeds to step 106 to determine if another incoming drawing objects exists. If not, as previously described, at step 120, the process of scanline table order list generation (as shown in FIG. 5) is executed, and the batch generating of drawing orders ends at step 122. Otherwise, at step 124, the flow returns to step 84 (step 124) shown in FIG. 4A to receive the next incoming drawing object.

The process of FIGS. 4A-4B may be executed with respect to two or more drawing objects that are each of one of predetermined object types including a vector object, a text object, and an image mask object, and that meet a predetermined condition (e.g., both drawing objects have the same foreground color that is opaque and a background color transparency of each drawing object is 100%). For instance, assuming that ROP associated with each of a first drawing object and a second drawing object does not include a destination color, the predetermined condition may be met when (i) a foreground color of the first drawing object is the same as a foreground color of second drawing object and both foreground colors are opaque, and, at least in some instances, (ii) a background color transparency of each of the first and second drawing objects is 100%. As noted above, in case of vector objects, a background color transparency may be taken to be 100%, and hence only foreground color properties may be considered for vector objects. The first drawing object and the second drawing object may be of the same object type (e.g., two vector objects, two image mask objects, or text objects) or may be of different object types.

By way of example, if the first drawing object is a first vector object and the second drawing object is a second vector object, then the predetermined condition may be met when a foreground color of the first vector object (or a first object color) is the same as a foreground color of the second vector object (or a second object color), and each of the colors is opaque. In another example, if the first drawing object is a vector object and the second drawing object is an image mask object, then the predetermined condition may be met when (i) a foreground color of the vector object (or an object color) and a foreground color of the image mask object (or a masking color) are both the same and opaque, and (ii) a background color transparency of the image mask object (or a transparency of an unmasking color) is 100%. Similarly, if the second drawing object is a text object, then the predetermined condition may be met when (i) the foreground color of the vector object and a foreground color of the text object (or a text color) are both the same and opaque, and (ii) a background color transparency of the text color object (or a transparency of a text background color) is 100%.

Further, in accordance with the process of FIGS. 4A-4B, as described above, each of the two or more drawing objects may be rendered to respective scanlines and the respective scanlines for each of the two or more of the drawings objects may be added to one scanline table. In this regard, as will be described later, the adding process may include merging/combining scanlines associated with one drawing object with scanlines associated with one or more other drawing objects, such as by updating a scanline associated with one drawing object to include a scanline associated with another drawing object. A drawing order list can then be generated at the same time, and hence only once, for all of the two or more drawing objects, thus reducing order generation time.

Referring now to FIG. 5, a flowchart depicting a process of scanline table order list generation process, as executed at steps 88, 112, and 120 of FIGS. 4A and 4B, will be described. As step 130, scanline table generation order list starts. At step 132, a determination is made as to whether a scanline table is empty. If the determination result at step 132 is that the scanline table is empty, the flow moves to step 138 at which the scanline order list generation ends.

If the scanline table is not empty, at step 134, an order list is generated for the scanline table. The order list is generated based on scanline data currently held in the scanline table. In this regard, the scanline table may hold parameters defining scanlines associated with respective drawing objects, and drawing orders may be generated based on scanline parameters held in the scanline table.

For example, scanline parameters associated with a given scanline and held in the scanline table may provide start and end coordinates of the given scanline (e.g., a scanline extending from (x1, y1) to (x2, y2)), and a drawing order to draw that scanline may include appropriate software commands to draw the scanline defined by those start and end coordinates. As noted above and will be described in more detail, the given scanline may be in some cases associated with multiple drawing objects as a result of combining scanlines corresponding to the multiple drawing objects. Hence, a number of drawing orders needed to draw the multiple drawing objects may be reduced. Further, for performance reasons, orders might be processed in system including hardware such as an ASIC or DSP for instance, in which memory for hardware may be separated from application software.

After the order list generation is completed, at step 136, the scanline table is emptied (i.e., scanline data held in the scanline table is deleted) to prepare the scanline table for collection of new scanline data. Then, at step 138, the scanline order list generation ends.

Figure 6:
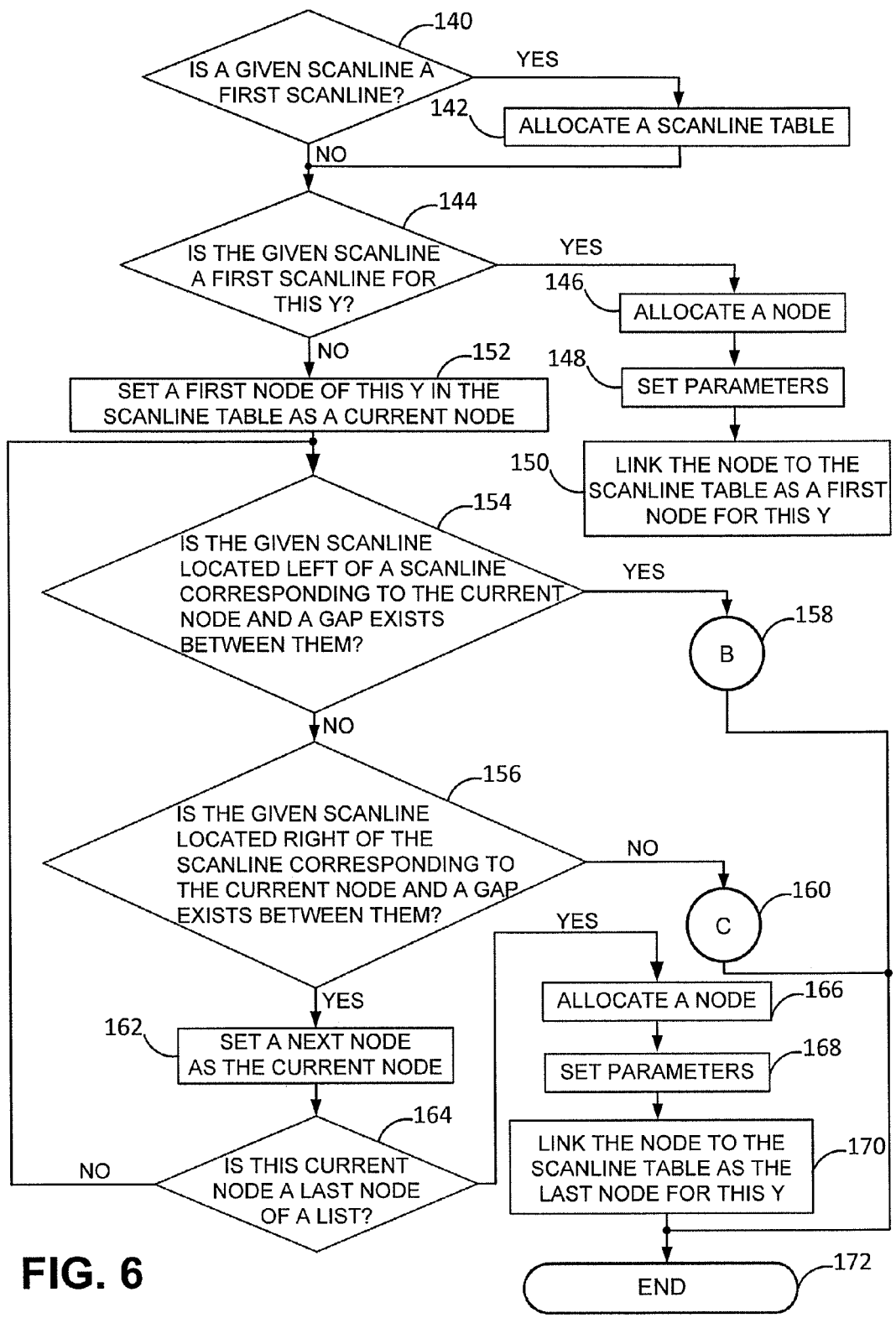
FIG. 6 is a flow chart depicting a process of adding a scanline to a scanline table, in accordance with an example embodiment.

FIG. 6 is a flowchart depicting a process of adding a scanline to a scanline table, in accordance with an example embodiment. As described above in connection with step 102 of the process of FIG. 4, once a drawing object is rendered to scanlines, the object scanlines are added to a scanline table, such as the scanline table 36.

In this regard, at step 140, a determination is made as to whether a given scanline is a first scanline to be stored in the scanline table. If the given scanline is the first scanline to be stored in the scanline table, at step 142, a space for the scanline table is allocated in memory, such in the data storage unit 14. If not, at step 144, a determination is made as to whether the given scanline is a first scanline for a particular y-coordinate (referred to in FIG. 6 as "this y-coordinate").

As a general matter, scanline data corresponding to a given scanline may include, for example, parameters defining the given scanline. In some embodiments, such parameters include a y-coordinate and a pair of start and end x-coordinates (e.g., (y1, x1) and (y1, x2)) defining an extent of the given scanline along an x-axis, with the start x-coordinate being smaller than the end x-coordinate. If the given scanline is the first scanline for the particular y-coordinate, then, at step 146, a memory location, or a "node," is allocated in the scanline table for storing parameters of the given scanline. At step 148, parameters of the given scanline, such as the start and end x-coordinates, are set (or stored) in the node. At step 150, that node is linked (e.g., via a memory pointer or the like) to the scanline table as a first node for the particular y-coordinate.

If, at step 144, the determination result is that the given scanline is not the first scanline for the particular y-coordinate, then, at step 152, a first node in the scanline table for the particular y-coordinate is set as a current node. At step 154, a determination is made as to whether (i) the given scanline is located left of (or on the left side of or to the left of) a scanline corresponding to the current node and (ii) a gap exists between those two scanlines. Note that, as used herein, the terms "left of," "on the left side of," and "to the left of," when used to describe a location of a first scanline relative to a location of a second scanline, mean that at least a start x-coordinate of the first scanline is smaller than a start x-coordinate of the second scanline. Further, a determination of whether a gap exists between two scanlines may be made based on respective start and end x-coordinates of the two scanlines (e.g., if an end x-coordinate of one scanline is smaller than a start x-coordinate of another scanline).

If the conditions at step 154 are not met, at step 156, a determination is made as to whether (i) the given scanline is located right of (or "on the right side of" or "to the right of") the scanline corresponding to the current node and (ii) a gap exists between those two scanlines. Note that, as used herein, the terms "right of," "on the right side of," and "to the right of," when used to describe a location of a first scanline relative to a location of a second scanline, mean that at least an end x-coordinate of the first scanline is greater than a start x-coordinate of the second scanline.

Figure 7:
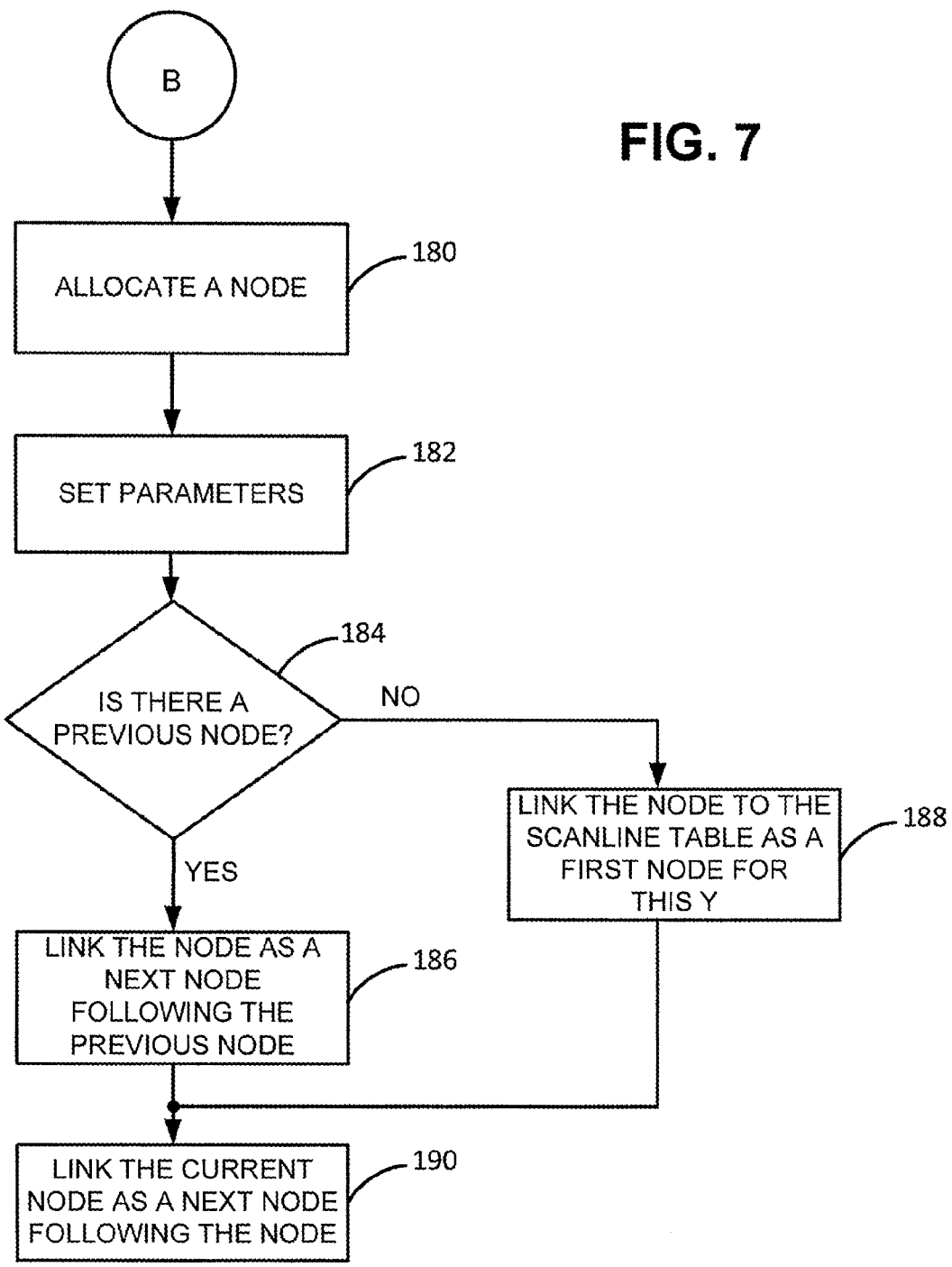
FIG. 7 is a flow chart depicting a process referenced in FIG. 6 and directed to inserting a scanline before another scanline, in accordance with an example embodiment.

If, at step 154, the determination result is that the given scanline is located left of the scanline corresponding to the current node, the flow moves to step 158 at which a process designated by "B" and shown in FIG. 7 is executed. The process "B" shown in FIG. 7 is directed to a process of inserting a scanline before another scanline and will be described in more detail in connection with FIG. 7. At step 158, the given scanline is inserted before the scanline corresponding to the current node.

Figure 8:
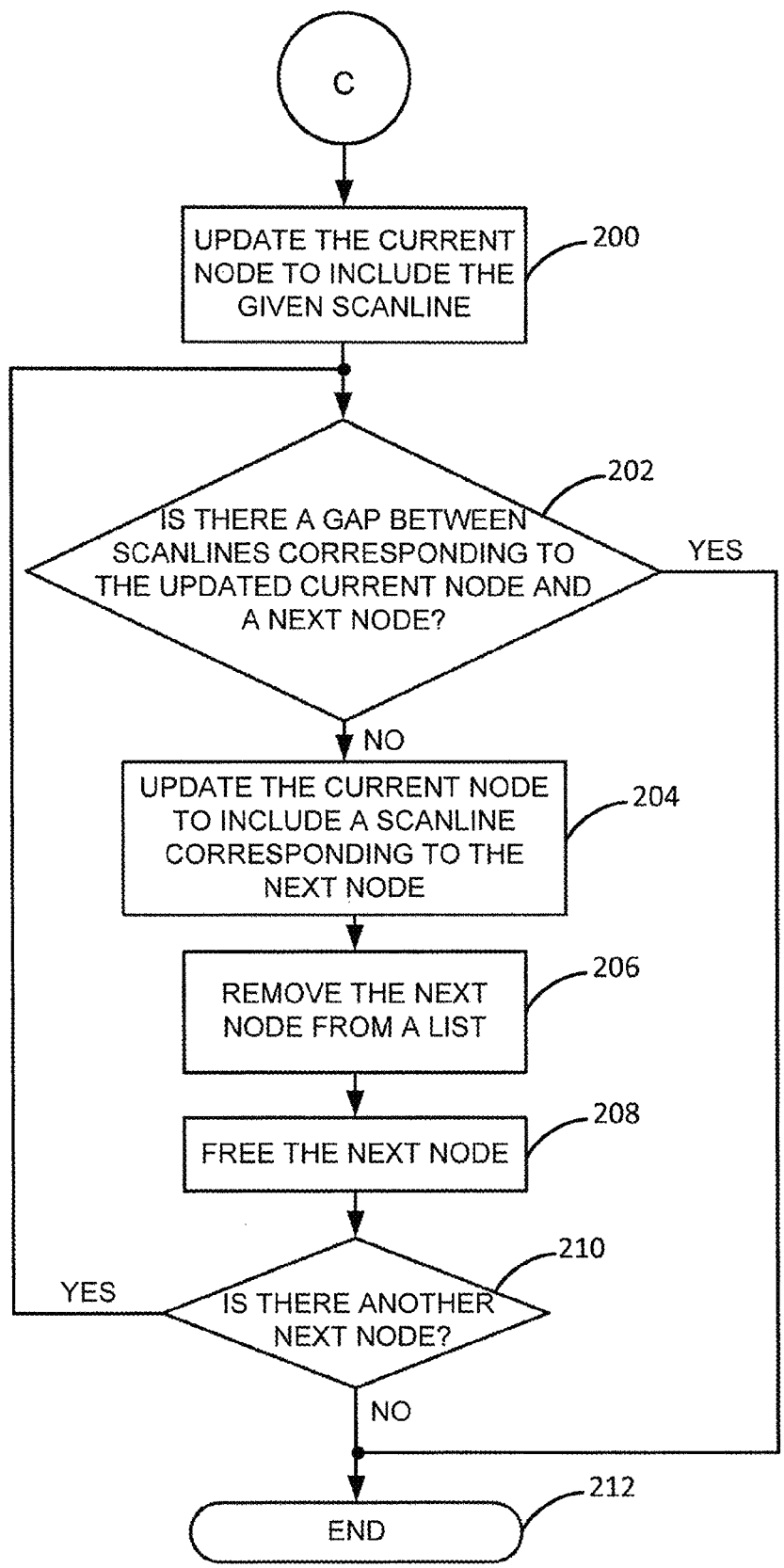
FIG. 8 is a flowchart depicting a process referenced in FIG. 6 and related to updating a node corresponding to one scanline to include another scanline, in accordance with an example embodiment.

If, at step 156, the determination result is that the given scanline is not located to the right of the scanline corresponding to the current node, the flow moves to step 160 at which a process designated by "C" and shown in FIG. 8 is executed. The process "C" shown in FIG. 8 is directed to a process related to updating a node corresponding to one scanline to include another scanline and will be described in more detail in connection with FIG. 8. When the process "C" is executed, the current node is updated to include the given scanline. Following step 158 or 160, the process of FIG. 6 ends at step 172.

If, however, the determination result at step 156 is that the given scanline is located right of the scanline corresponding the current node, a next node is set as the current node, at step 162. In other words, when the given scanline is located right of the scanline corresponding to a node currently set as the current node, another node held in the scanline table for the particular y-coordinate and linked to the current node as the next node is set as the new current node.

In this regard, nodes corresponding to scanlines associated with the particular y-coordinate may be in the form of a linked list (e.g., a singly linked list), or a sequence of nodes in which each node includes data and a "link," or a reference/pointer, to a next node in the list. In this regard, a node in the scanline table may store scanline parameters, such as a start x-coordinate and an end x-coordinate of the scanline, and a "pointer for next node" parameter. If a given node is linked to a next node in a list, the "pointer for next node" parameter may include an address for the next node. Hence, at step 162 in FIG. 6, since a node corresponding to the given scanline has not been yet inserted within a list associated with the particular y-coordinate, a determination of which node is "next" may be made by looking at a link/pointer to the next node of the node set as the current node and already stored in the scanline table.

Then, at step 164, a determination is made as to whether the current node, as set at step 162 (or "this current node," as shown in FIG. 6), is a last node of a list for the particular y-coordinate. With respect to step 164, if a node is a last node of the list (i.e., it is not linked to another following node), an address of the "pointer for next node" may be set, e.g., to "NULL." However, in other embodiments, the last node may be designated by linking it, e.g., to any other suitable terminator that indicates the end of the list.

If, at step 164, the determination result is that the current node, as set at step 162 is not the last node of the list, the flow returns to step 154. If, however, the current node is the last node of the list, then, at step 166, a node is allocated for storing parameters of the given scanline in the scanline table. At step 168, the parameters of the given scanline, such as the start and end x-coordinates, are set (or stored) in that node. Then, at step 170, that node is linked to the scanline table as the last node for the particular y-coordinate. The process then ends at step 172.

Referring now to FIG. 7, the process "A" referenced in FIG. 7 and directed to inserting a scanline before another scanline, in accordance with an example embodiment, will be described. As described above in connection with FIG. 6, this process is executed at step 158 with respect to the given scanline when the given scanline is located to the left of the scanline corresponding to the current node and a gap exists between those two scanlines.

As shown in FIG. 7, at step 180, a node is allocated for storing parameters of the given scanline in the scanline table (e.g., the scanline table 36). At step 182, parameters of the given scanline are set in the scanline table for that node. At step 184, a determination is made as to whether a previous node exists. The previous node corresponds to a node that, at this point, immediately precedes a node set as the current node. In other words, at this point, the previous node contains a link to the current node as a "next" node. If the previous node exists, at step 186, the node corresponding to the given scanline is linked to the previous node as a next node following the previous node. Hence, the node corresponding to the given scanline is inserted between the previous node and the current node. Note that linking of one node to another node generally refers herein to associating one node with another node in a sequence of nodes, or a list, as discussed above.

If the previous node does not exist, at step 188, the node corresponding to the given scanline is linked (e.g., via a memory pointer or the like) to the scanline table as a first node for the particular y-coordinate. Following steps 186 and 188, at step 190, the current node is linked to the node corresponding to the given scanline as a next node following the node corresponding to the given scanline. Hence, by executing the process "B" at step 158 of FIG. 6, the given scanline is inserted before the scanline corresponding to the current node.

FIG. 8 is a flowchart illustrating the process "C" referenced in FIG. 6 and related to updating a node corresponding to one scanline to include another scanline, in accordance with an example embodiment. As described above in connection with FIG. 6, this process is executed at step 160 to update a node set as the current node to include the given scanline when no gap exists between the given scanline and a scanline corresponding to the current node.

As shown in FIG. 8, at step 200, a node corresponding to the current node is updated to include the given scanline. More specifically, at step 200, a scanline corresponding to the current node is updated to include the given scanline. In this regard, scanline parameters of the scanline corresponding to the current node are updated to include the parameters of the given node, such as the start and end x-coordinates of the given node, as noted previously. Then, at step 202, a determination is made as to whether a gap exists between scanlines corresponding to the updated current node and a next node that follows the updated current node. If so, the process ends the process ends at step 212.

If no gap exists between the scanlines corresponding to the updated current node and the next node, at step 204, the current node is updated again to include a scanline corresponding to the next node. Such scenario would arise if a scanline corresponding to the updated current node was overlapped by the scanline corresponding to the next node over its partial or full extent. At steps 206 and 208, respectively, the next node relative to the updated current node is removed from a list, namely the list for the particular y-coordinate as discussed in a connection with FIG. 6, and a memory location allocated to the next node in the scanline table is freed up. The process then checks, at step 210, if there is another next node to process that follows the previously processed node that was removed. Namely, after the node removal, the process checks if there is another node that sequentially follows the updated current node in the scanline table. If not, the process ends at step 212. Otherwise, the process returns to step 202.

Figure 9:
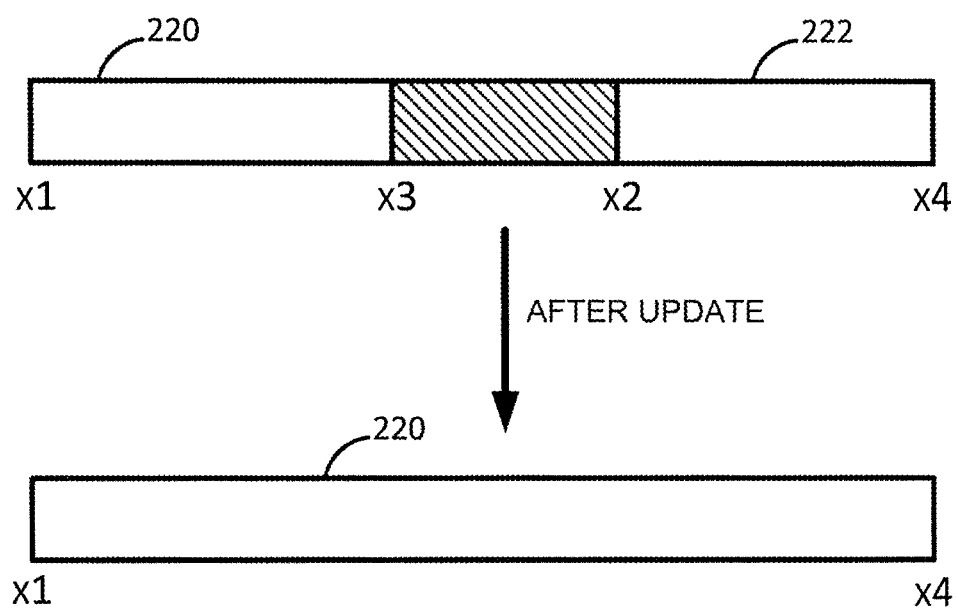
FIG. 9 illustrates an example of two scanlines in which one scanline is updated to include another scanline.

FIG. 9 illustrates an example of two scanlines 220 and 222 in which the scanline 220 is updated to include the scanline 222. This example assumes that the scanlines 220 and 222 have the same y-coordinate (e.g., y1) and extend along an x-axis. In particular, as shown in FIG. 9, x1 and x2 are start and end coordinates of the scanline 220, respectively, while x3 and x4 are start and end coordinates of the scanline 222. Further, as shown in FIG. 9, the scanline 222 overlaps the scanline 220 over a partial extent of the scanline 220. In accordance with the process of FIG. 8, the scanline 220 can be updated to include the scanline 222. As such, scanline parameters of the scanline 220, i.e., the start and end x-coordinates of the scanline 220, are merged with the parameters scanline 220 such that the start and end x-coordinates of the scanline 220 become x1 and x4.

Hence, a node corresponding to the scanline 220 in a scanline table would be updated to store updated scanline parameters of the scanline 220. Although not illustrated, if, in another example, the scanline 222 overlapped the scanline 220 over a full extent of the scanline 220 (i.e., along the x-axis, x3 would be smaller than x1), then the scanline 220 may be similarly updated to include the scanline 222, with the start and end x-coordinates of the scanline 220 becoming x3 and x4.

3. Working Examples

Figure 10:
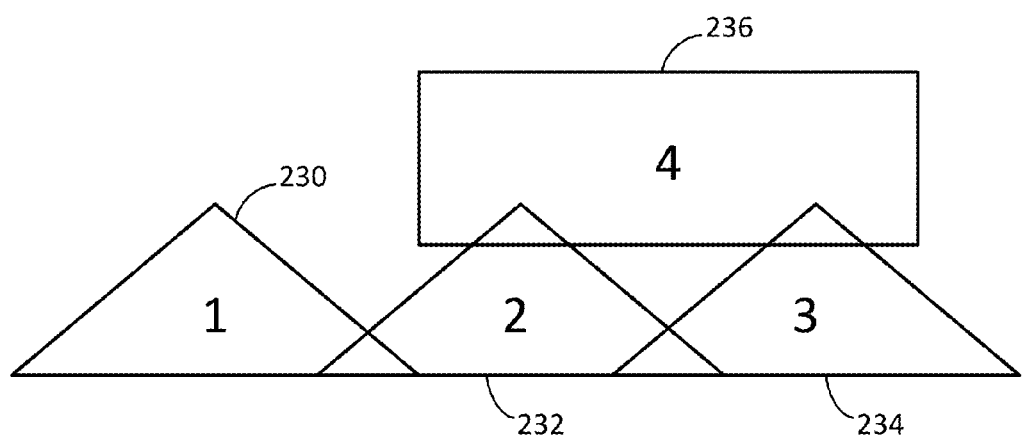
FIG. 10 illustrates an example of a group of four drawing objects to be rendered for printing an image.

FIGS. 10-12 are examples illustrating various processes described herein in connection with FIGS. 3-8 that could be carried out in the image forming apparatus 10, such as by the control unit 12.

FIG. 10 illustrates an example of a group of four drawing objects 230, 232, 234, and 236 to be rendered for printing an image. Note that the drawing objects 230-236 are also respectively designated in FIG. 10 as drawing objects "1," "2," "3," and "4" to indicate an order of processing the drawing objects 230-236. As shown in FIG. 10, each of the drawing objects 230-234 has a shape of a triangle, while the drawing object 236 has a shape of a rectangle. Further, the example of FIG. 10 assumes that each of the drawing objects 230, 232, 234, and 236 is of the same object type, namely, a vector object, and meets a predetermined condition requiring that the drawing objects 230-236 have the same object color (e.g., the same pen and brush colors such that the entirety of each drawing object is of that color and ROP associated with each object does not include a destination color) and the object color is opaque. FIGS. 11A-11G illustrate processing of scanlines associated with the drawing objects 230-236 in accordance with the processes of FIGS. 3-8.

Figure 11A:
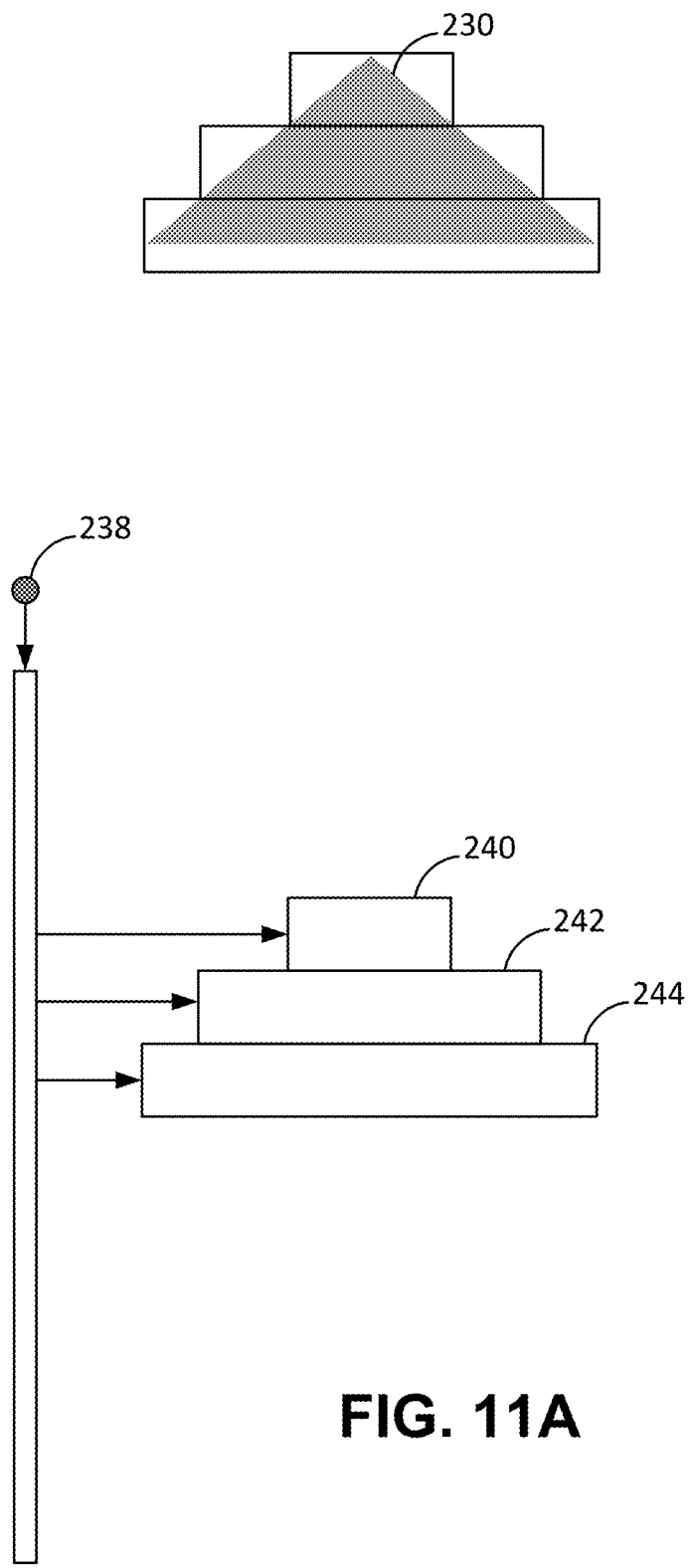
FIGS. 11A-11G illustrate processing of scanlines associated with the drawing objects of FIG. 10, in accordance with the processes of FIGS. 3-8.

As shown in FIG. 11A, the drawing object 230 is rendered to scanlines 240-244 and the scanlines 240-244 are added to the scanline table 36 (note that the scanline table 36 and nodes therein are shown only conceptually in FIGS. 11A-11G for illustrative purposes). Although not shown, a space for the scanline table 36 is allocated in the data storage unit 14 of the image forming apparatus 10, and an anchor 238, or a memory address, associated with the scanline table 36 is assigned.

When the scanlines 240-244 are added to the scanline table 36, a respective node associated with each one of those scanlines is allocated for storing parameters of the scanline, as shown in FIG. 11A. More particularly, when the drawing object 230 is processed, three nodes, each respectively associated with one of the scanlines 240, 242, and 244, are allocated in the scanline table 36 and registered or, in other words, added to the scanline table 36. In this regard, each respective scanline 240, 242, and 244 is associated with a different y-coordinate (e.g., y1, y2, and y3) and each of the corresponding nodes is set as a first node for a particular y-coordinate.

Figure 11B:
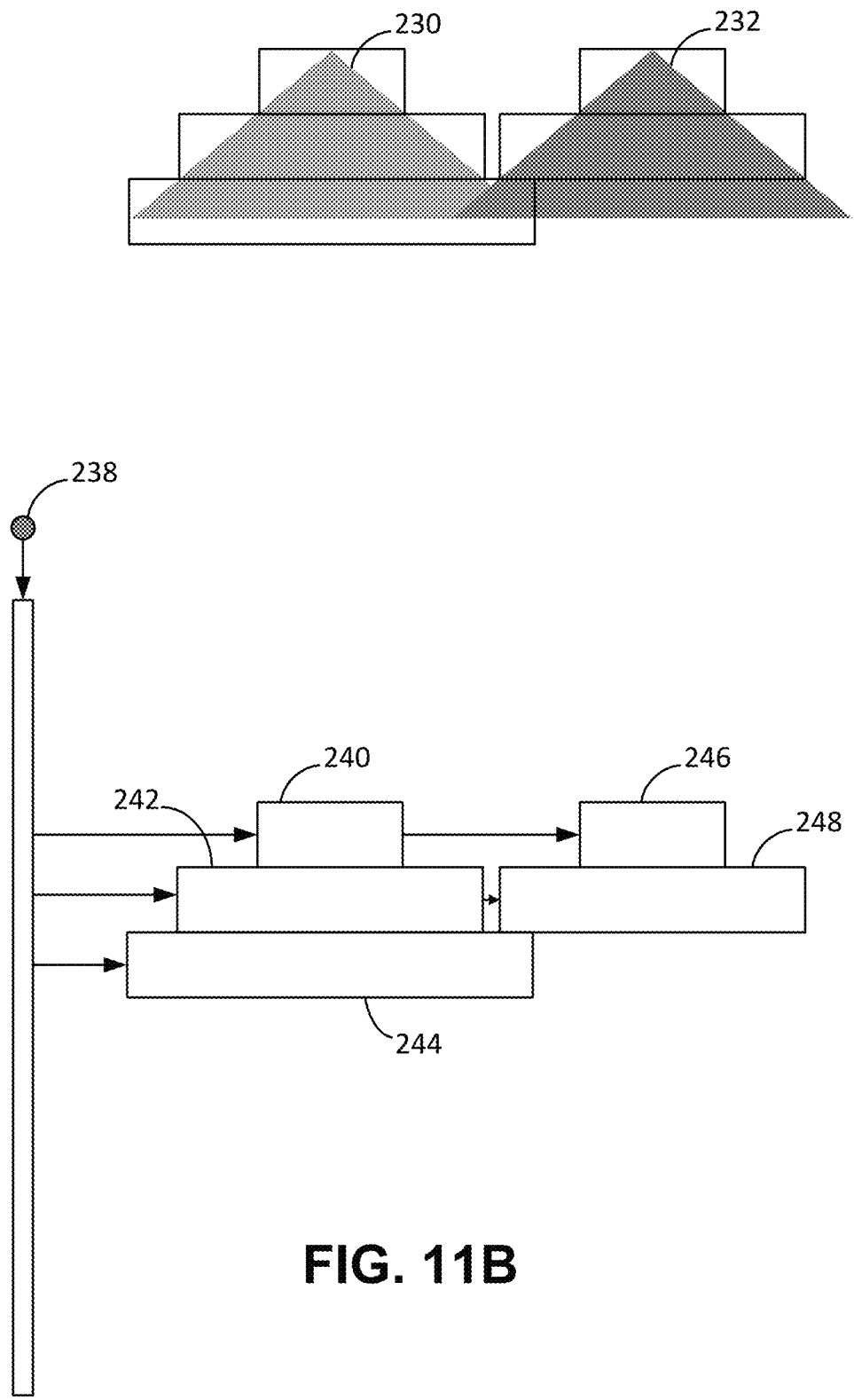

As shown in FIG. 11B, when the drawing object 232 is processed, two nodes, each respectively associated with one of scanlines 246 and 248, are allocated in the scanline table 36 and registered. In accordance with the process of FIG. 6, since each of the scanlines 246 and 248 is located right of the scanlines 240 and 242, respectively, and a gap exists between those respective scanlines, each of the scanlines 246 and 248 is associated with a separate node in the scanline table 36. However, a third scanline 250 of the drawing object 232, as shown in FIG. 11C, partially overlaps the scanline 244 of the drawing object 230.

Figure 11C:
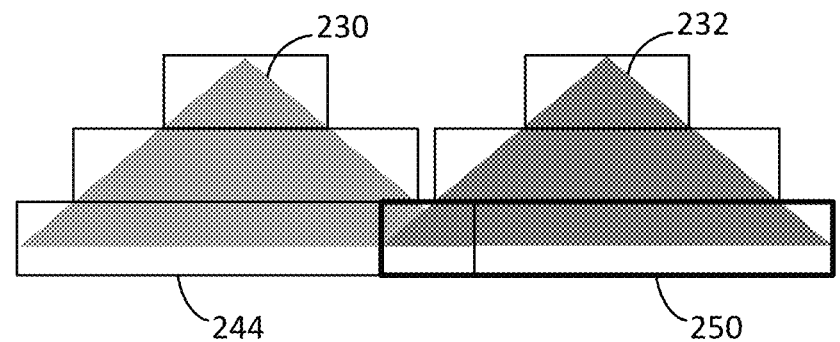
Figure 11C:
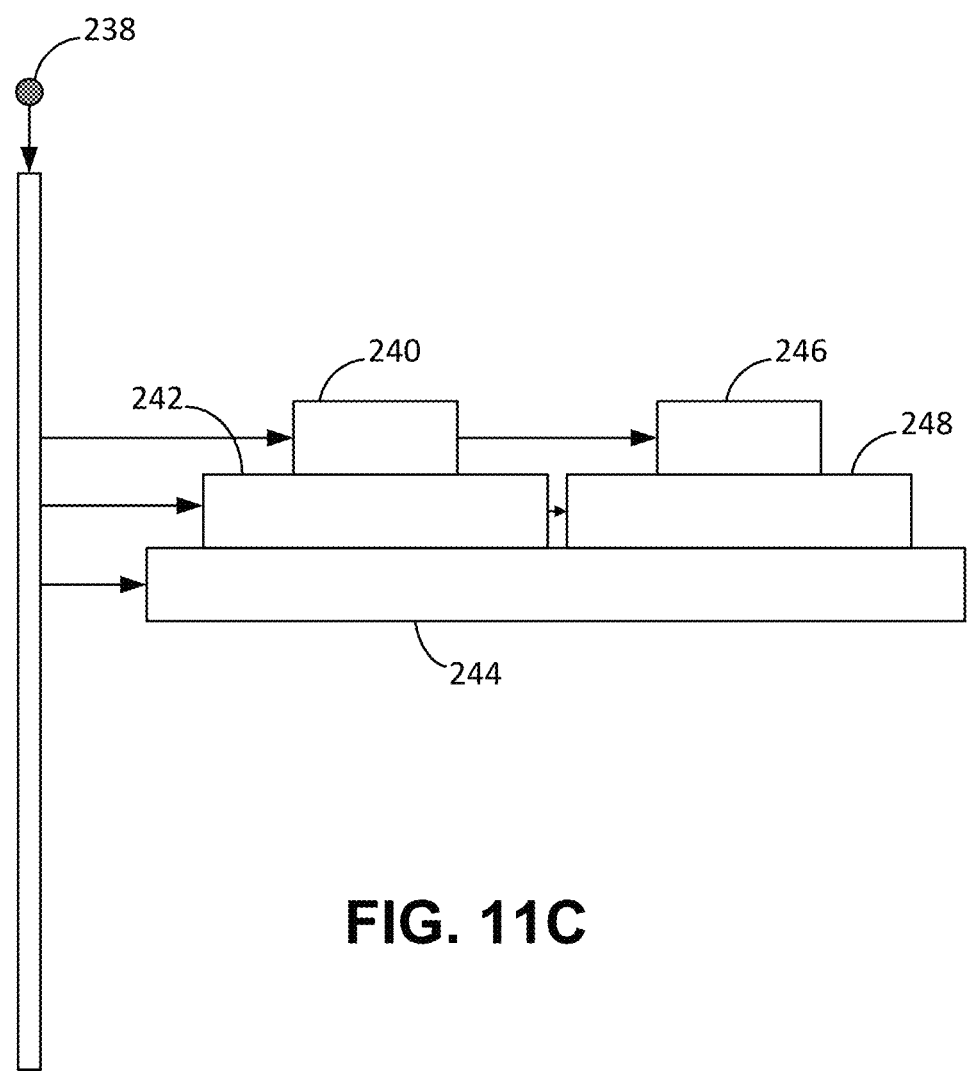

Assuming that a y-coordinate of the scanline 244 is the same as a y-coordinate of the scanline 250 shown in FIG. 11C, the scanline 244, and hence the corresponding node in the scanline table 36, is updated to include the scanline 250, as explained above in connection with FIG. 8. Accordingly, parameters of the scanline 244 are merged with parameters of the scanline 250 such that, after the update, the scanline 244 is associated with the same y-coordinate but now has a different end x-coordinate, namely, an end x-coordinate of the scanline 250.

Figure 11D:
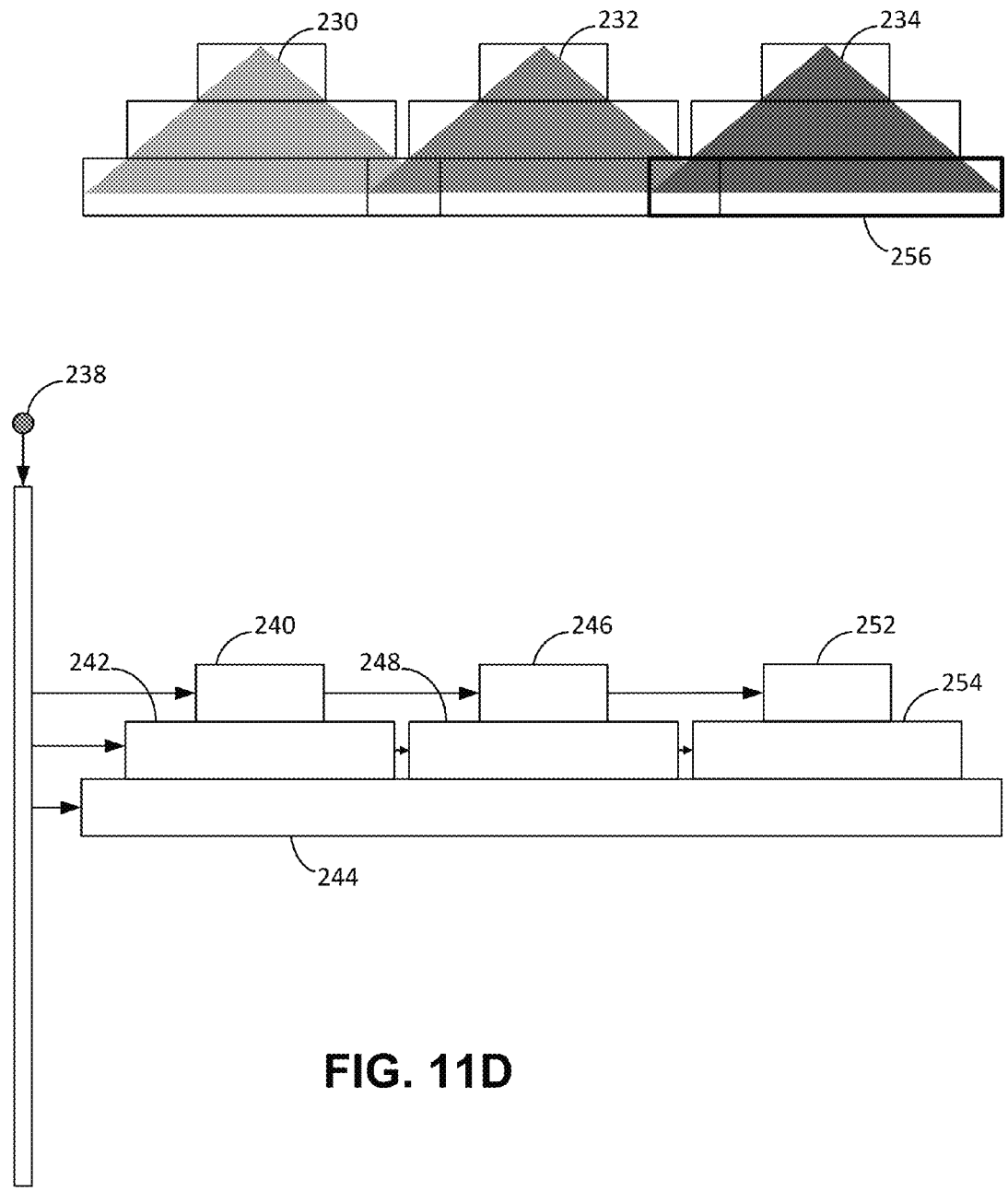

The processing of scanlines associated with the drawing object 234 is carried out in a similar way as described in connection with the drawing object 232. In this regard, as shown in FIG. 11D, nodes corresponding to first two scanlines 252 and 254 of the drawing object 234 are allocated in the scanline table 36 and registered. However, a third scanline 256 of the drawing object 234 partially overlaps the scanline 244 previously updated to include the scanline 250 of the drawing object 232. Hence, in accordance with the process of FIG. 8, the updated scanline 244 is further updated to include the scanline 256.

Figure 11E:
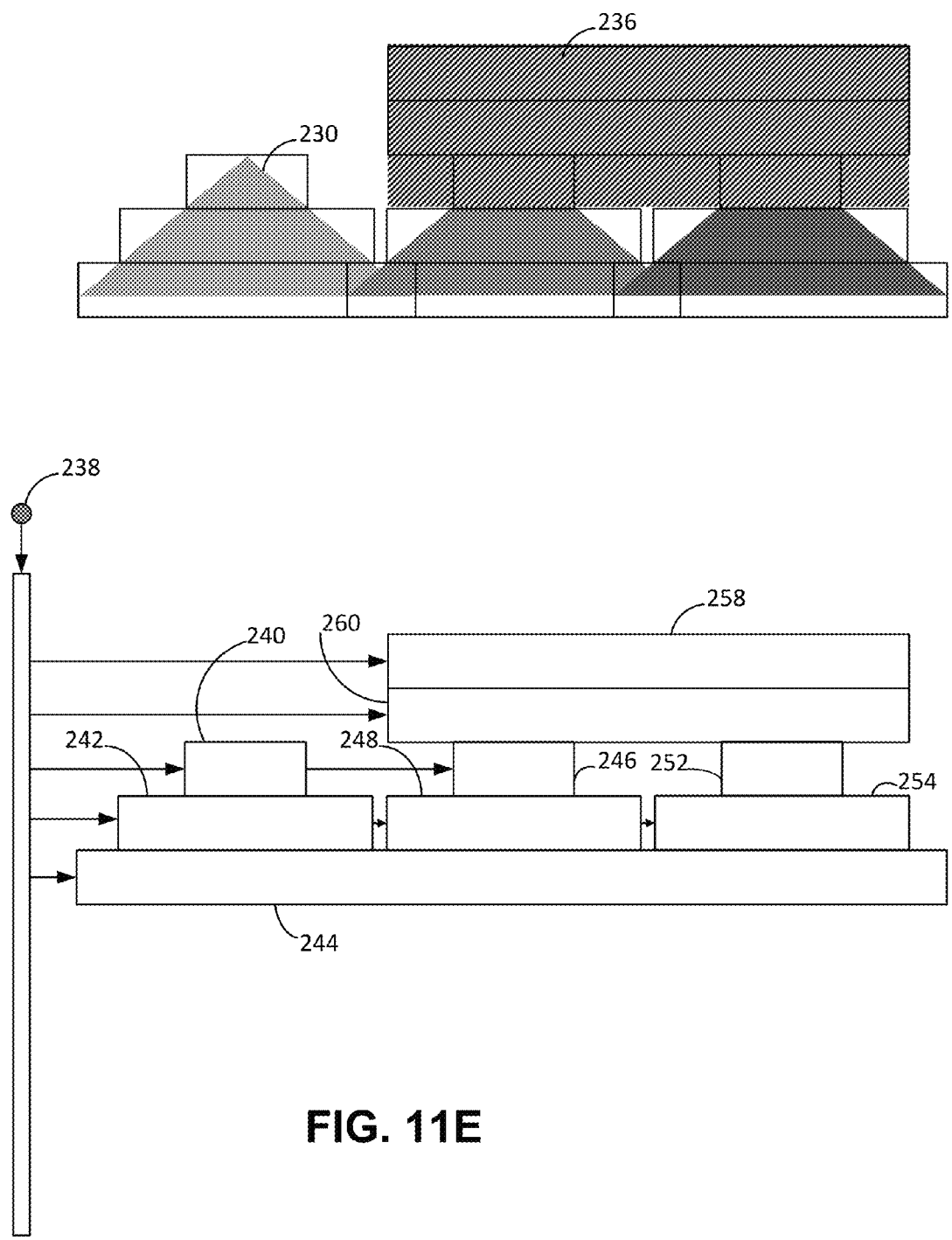
Figure 11F:
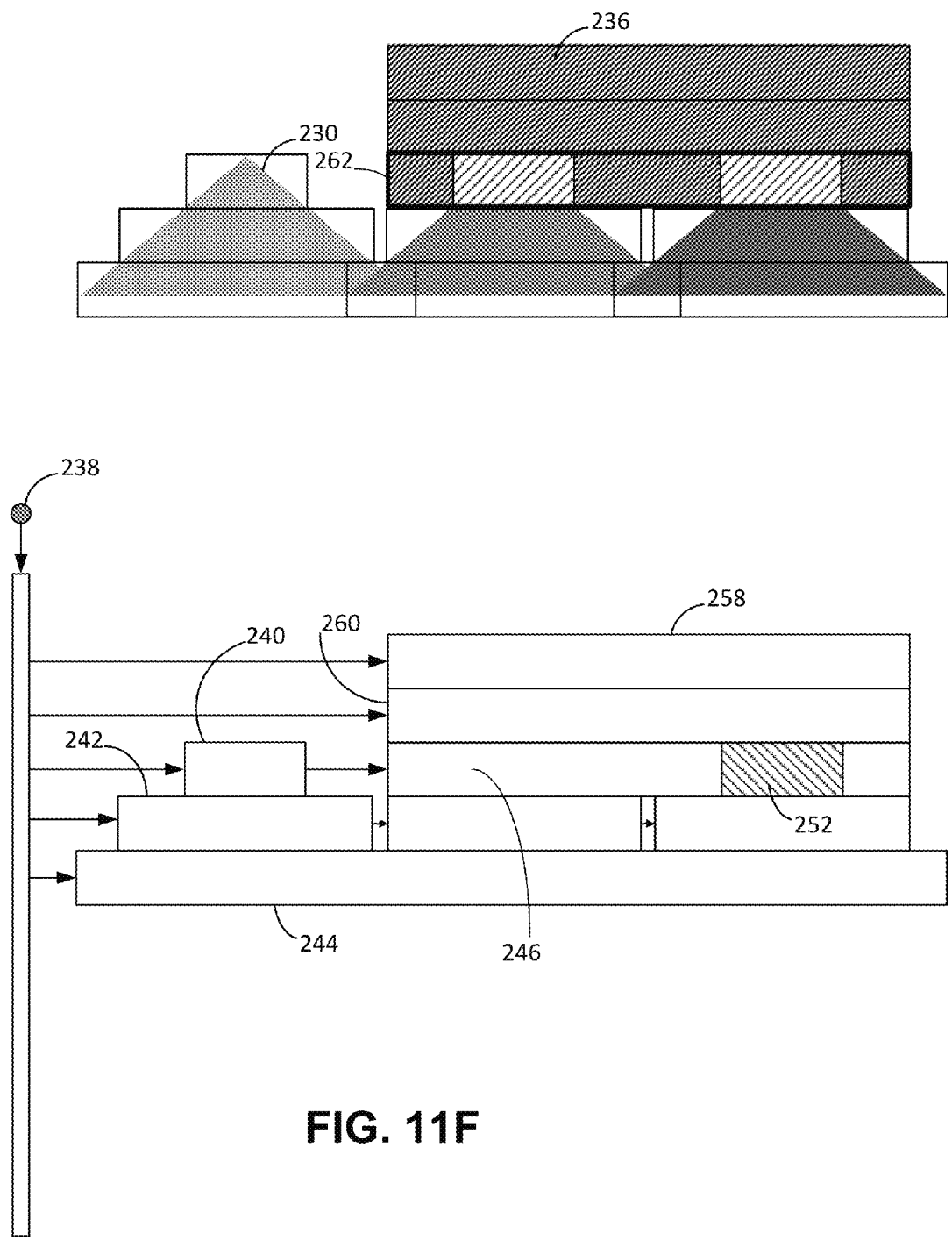
Figure 11G:
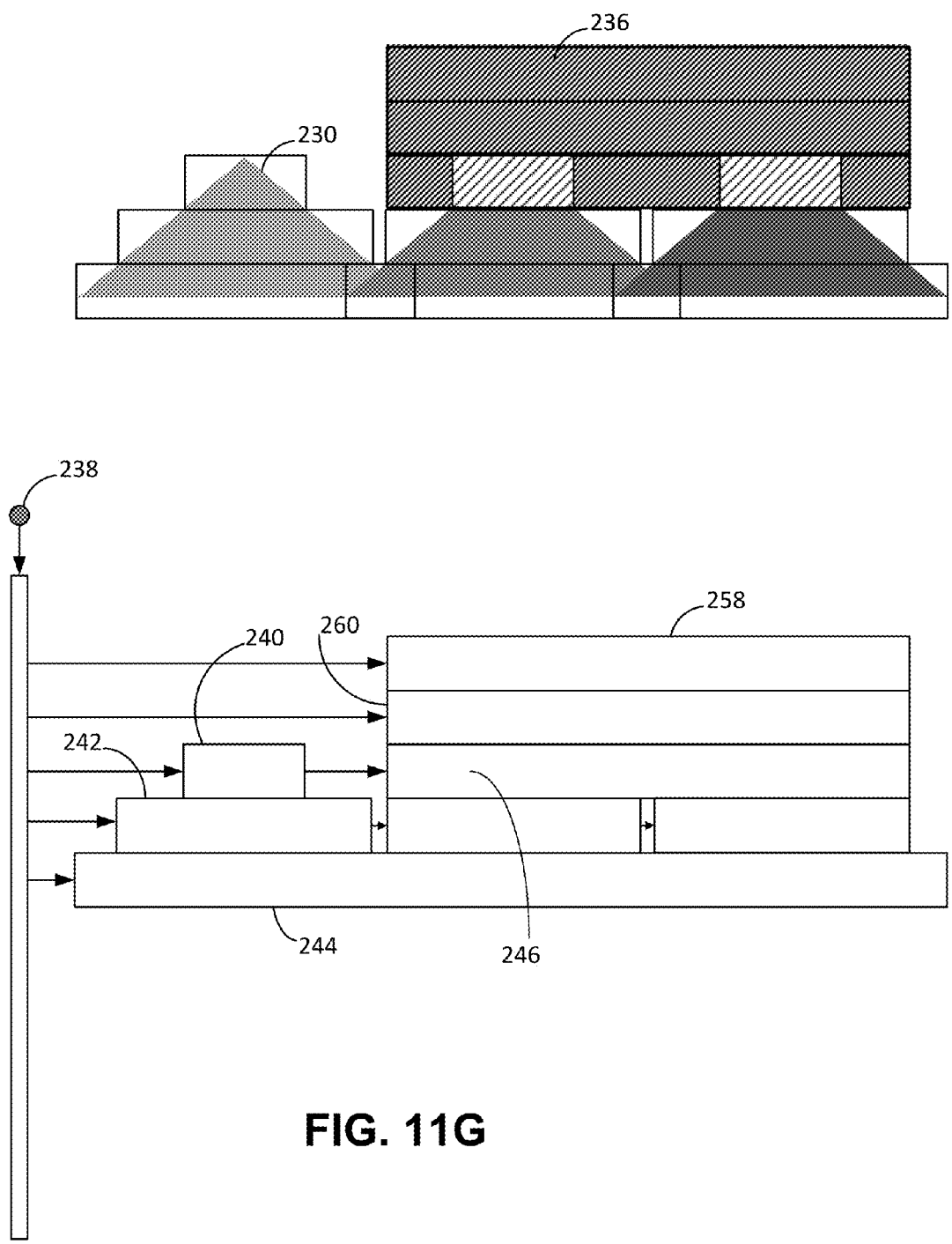

As shown in FIG. 11E, when processing scanlines associated with the drawing object 236, two nodes, each respectively associated with one of scanlines 258 and 260, are allocated in the scanline table 36 and registered. A third scanline 262 of the drawing object 236 fully overlaps the scanline 246 of the drawing object 232. Hence, the scanline 246 of the drawing object 232 may be updated to include the scanline 262 of the drawing object 236. Further, in accordance with the process of FIG. 8, the scanline 246 may be further updated to include a next node corresponding to the scanline 252 of the drawing object 234, as shown in FIG. 11F. Accordingly, as shown in FIG. 11G, the node corresponding to the scanline 252 of the third triangle drawing object 236 may be "freed" and scanline data associated with the scanline 252 deleted from the scanline table 36.

In the present example, the drawing objects 230-236 that are each a vector object and that meet the predetermined condition (i.e., have the same object color that is opaque) are each rendered to scanlines and the scanlines associated with those drawing objects are combined together in the scanline table 36. A drawing order list for drawing all of the drawing objects 230-236 may be then generated at the same time based on the scanlines in the scanline table 36. In this regard, for example, a single drawing order may be generated for any of the scanlines that have been merged together (as explained above), thus improving order generation time.

Figure 12A:
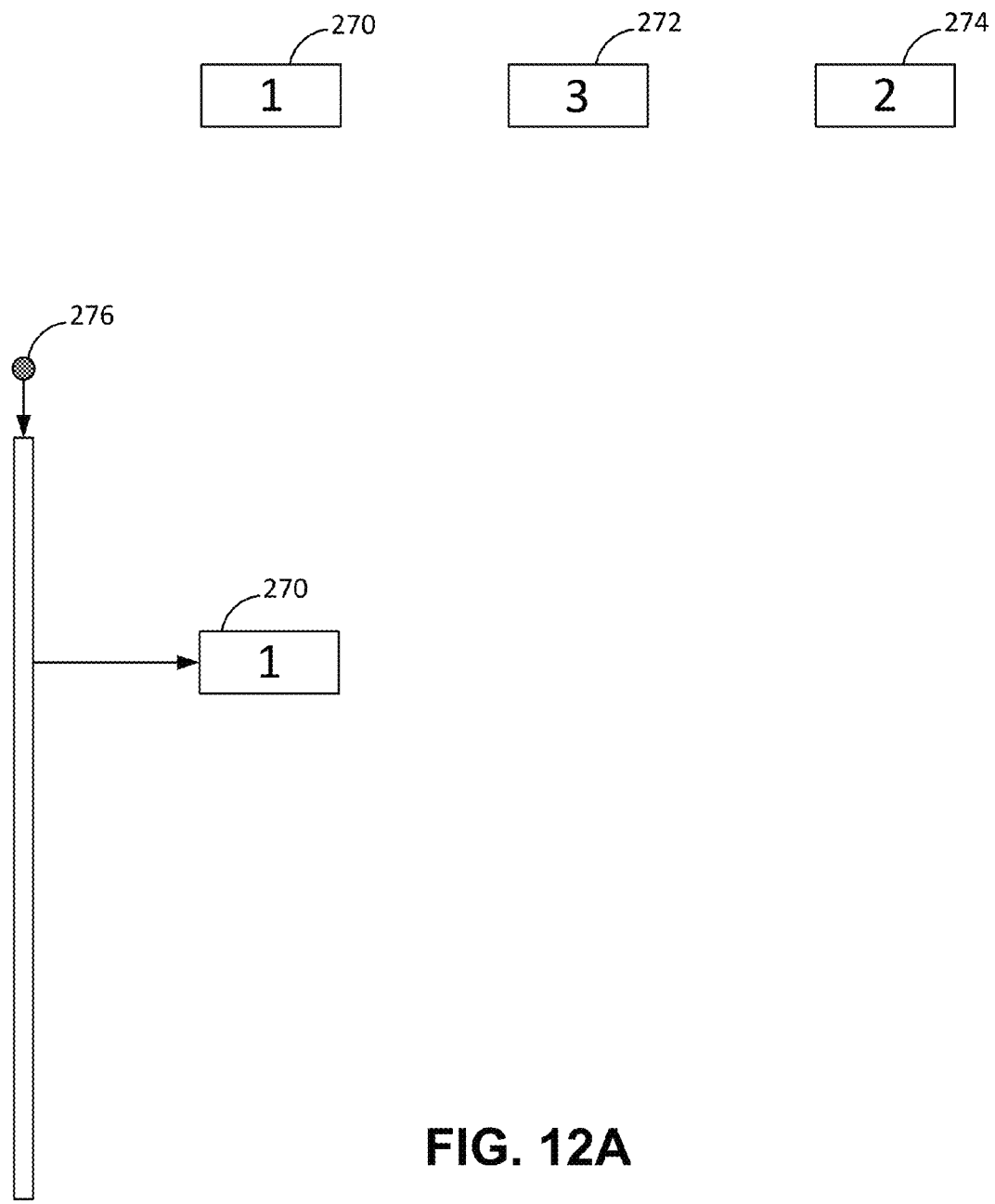
FIGS. 12A-12C illustrate an example of a process of adding three scanlines to a scanline table, in accordance with the processes of FIGS. 6-7.
Figure 12B:
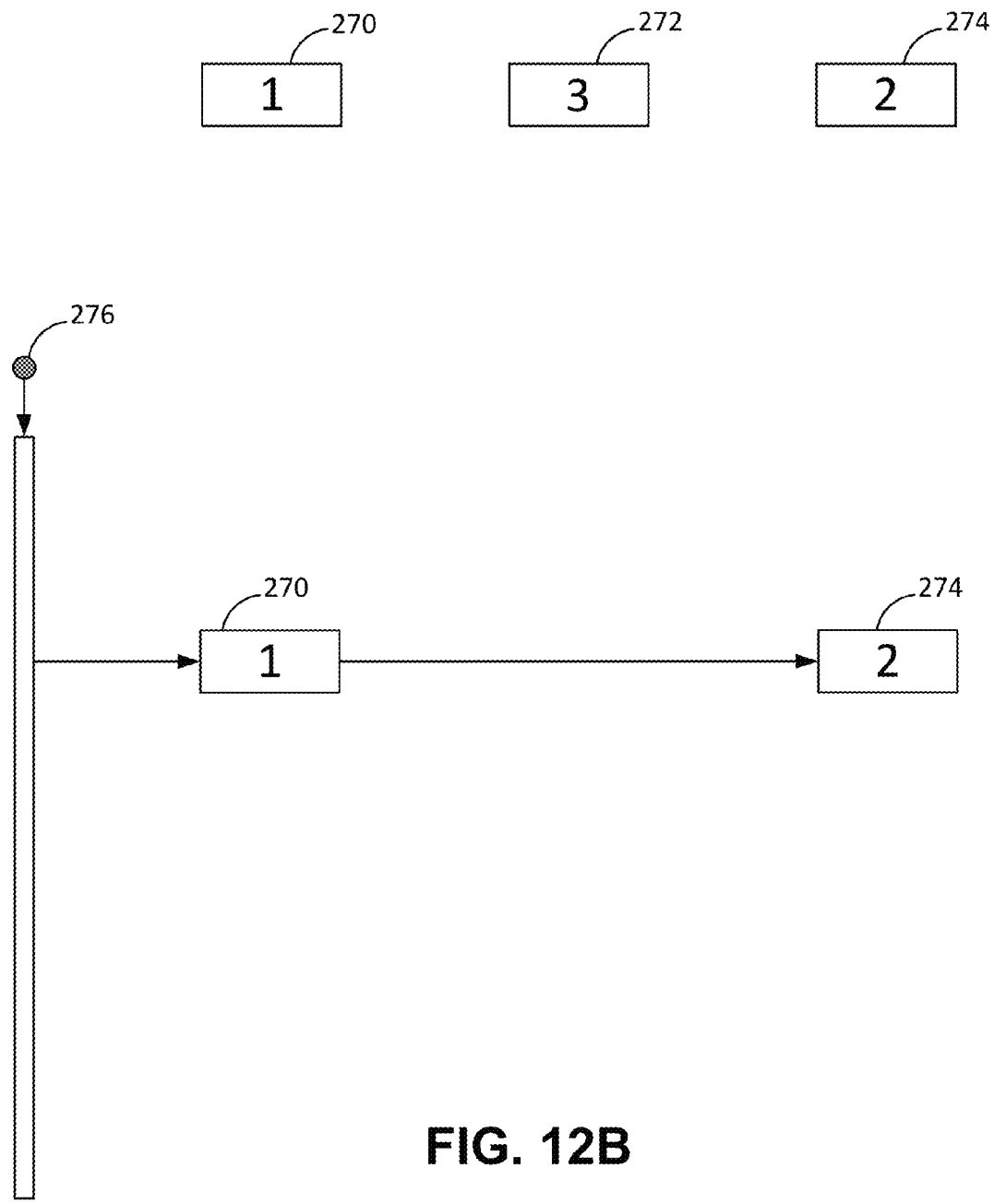
Figure 12C:
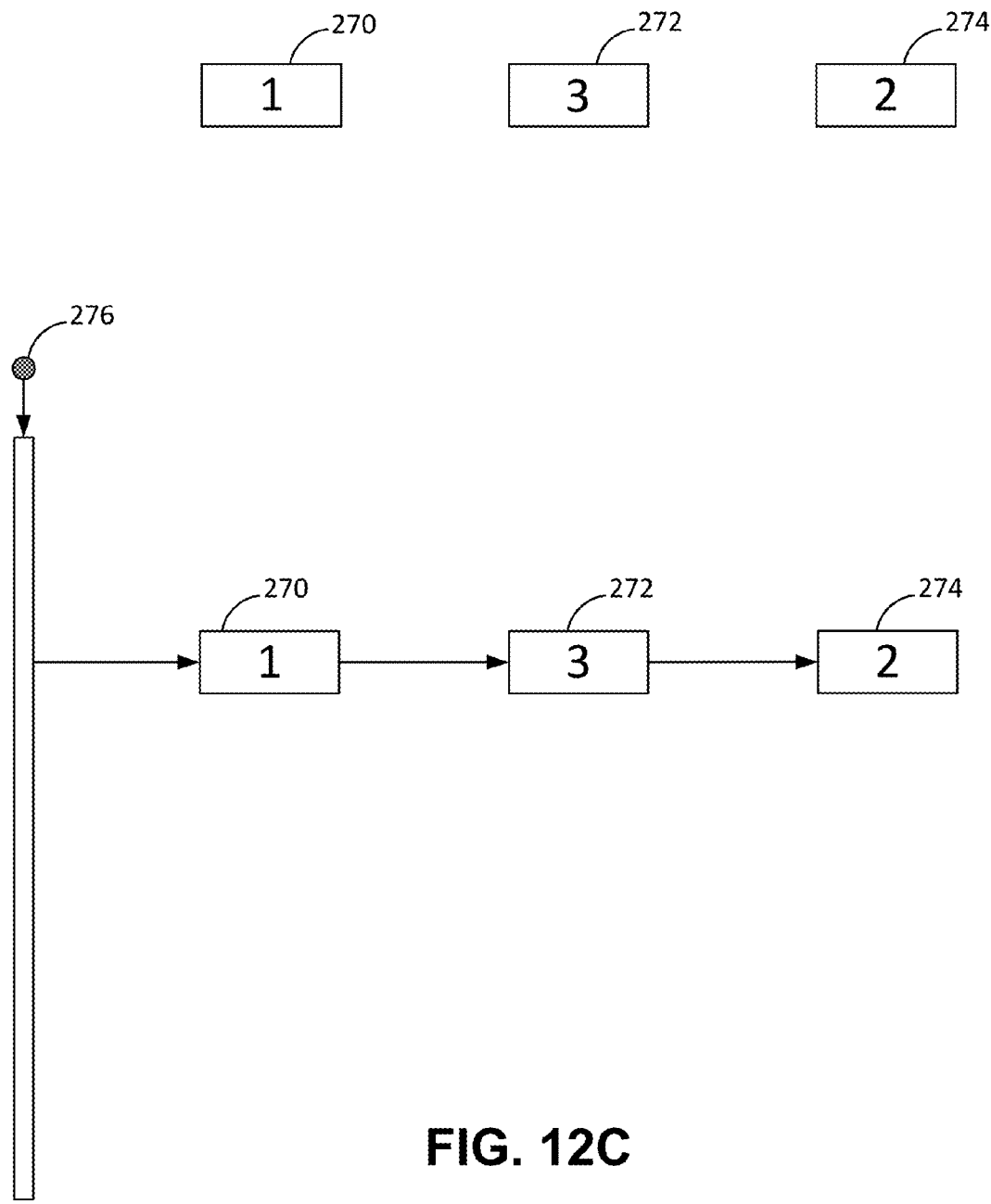

FIGS. 12A-12C illustrate an example of a process of adding three scanlines to a scanline table, such as the scanline table 36. The present example assumes that three scanlines 270, 272, and 274 (also respectively designated in FIG. 12A-12C as scanlines "1," "3," and "2" to indicate an order of processing the scanlines 270-274) are to be added to the scanline table 36 and are all associated with the same y-coordinate. As shown in FIGS. 12A-12C, the scanline table 36 has an anchor 276 associated therewith.

When the scanline 270 comes in for processing, a determination is made as to whether the scanline 270 is a first scanline to be stored in the scanline table 36 (see step 140 in FIG. 6). Assuming that the scanline 270 is not the first scanline (and hence the scanline table 36 already exists), a determination is made as to whether the scanline 260 is a first scanline for a particular y-coordinate (see step 144 in FIG. 6). Assuming that the scanline 270 is the first scanline for the particular y-coordinate, a node corresponding to the scanline 270 is allocated in the scanline table 36, parameters of the scanline 260 are stored in that node, and the node is linked to the scanline table 36 as a first node for the particular y-coordinate (see steps 146-150 in FIG. 6).

When the scanline 274 comes in for processing, as shown in FIG. 12B, a determination is made that the scanline 274 is not the first scanline for the particular y-coordinate (see step 144 in FIG. 6). Accordingly, the node corresponding to the scanline 270 is set a current node (see step 152 in FIG. 6). Then, a determination is made as to whether the scanline 274 is located left of the scanline 270 corresponding to the current node and whether a gap exists between those two scanlines (see step 154 in FIG. 6). Since the scanline 274 is not located to the left of the scanline 270, a determination is then made as to whether the scanline 274 is located to the right of the scanline 270 corresponding to the current node and whether a gap exists between those two scanlines (see step 156 in FIG. 6). Since the scanline 274 is located right of the scanline 270 corresponding to the current node and a gap exists between the two scanlines, in accordance with the process of FIG. 6, a next node would be then set as the current node (see step 162 in FIG. 6).

However, in the present example, no "next node" relative to the current node and corresponding to another scanline exists in the scanline 36, and hence the current node remains to be the same. A determination of whether the current node is the last node of the list may be made by checking, for example, a "pointer for next node" parameter of the current node, as noted hereinabove. Further, since the current node corresponding to the scanline 270 is the last node of the list (see step 164 in FIG. 6) currently in the scanline table 36, a node is allocated for storing parameters of the scanline 274 in the scanline table 36 and the parameters stored therein (see steps 166 and 158 in FIG. 6). Then, the node corresponding to the scanline 274 is linked to the scanline table 36 as the last node for this particular y-coordinate (see step 170 in FIG. 6).

When the scanline 272 comes in for processing, as shown in FIG. 12C, a determination is made that the scanline 272 is not the first scanline for the particular y-coordinate (see step 144 in FIG. 6). Accordingly, the node corresponding to the scanline 270 is set as the current node (see step 152 in FIG. 6). Then, a determination is made as to whether the scanline 272 is located left of the scanline 270 corresponding to the current node and a gap exists between those two scanlines (see step 154 in FIG. 6). Since the scanline 272 is not located to the left of the scanline 270, a determination is then made as to whether the scanline 272 is located to the right of the scanline 270 corresponding to the current node and whether a gap exists between those two scanlines (see step 156 in FIG. 6). Since the scanline 272 is located right of the scanline 270 corresponding to the current node and a gap exists between the two scanlines, a next node that corresponds to the scanline 274 is then set as the current node (see step 162 in FIG. 6).

In this regard, since the node corresponding to the scanline 274 is next after the node corresponding to the scanline 270 in the list, that node is now set as the current node. Further, since this current node is not the last node of the list (see step 164 in FIG. 6), a determination is then made as to whether the scanline 272 is located left of the scanline 274 corresponding to the current node and a gap exists between those two scanlines (see step 164 in FIG. 6). Since the scanline 272 is located to the left of the scanline 274 and a gap exists between those two scanlines, the process of inserting a scanline before another scanline, as illustrated in FIG. 7, is then executed (see step 158 of FIG. 6). As a result, the scanline 272 is inserted before the scanline 274 corresponding to the current node, and a node corresponding to the scanline 272 is inserted between the nodes corresponding to the scanlines 270 and 274.

Figure 13A:
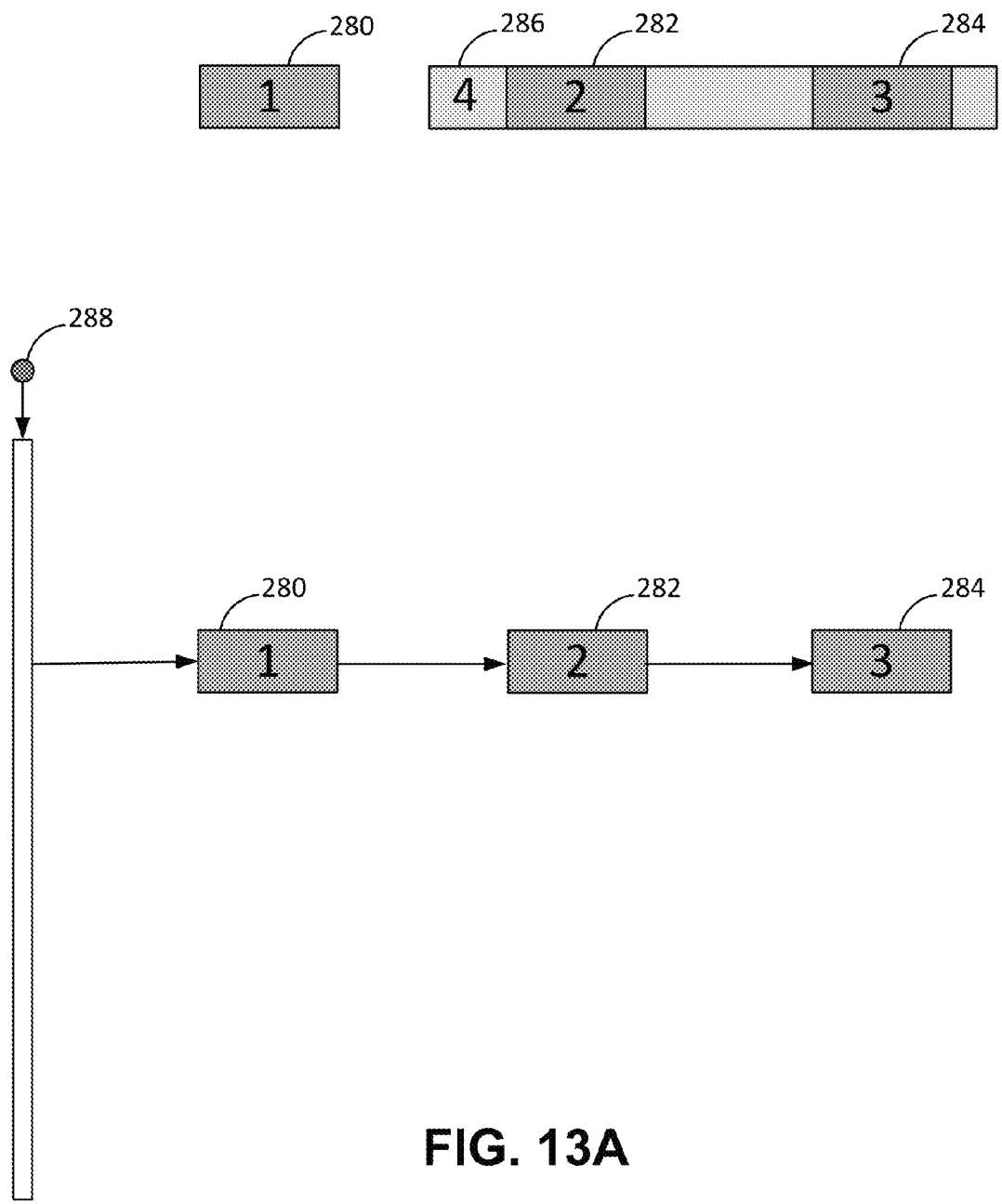
FIGS. 13A-13B illustrate an example of a process related to updating a node corresponding to one scanline to include another scanline, in accordance with the processes of FIGS. 6 and 8.
Figure 13B:
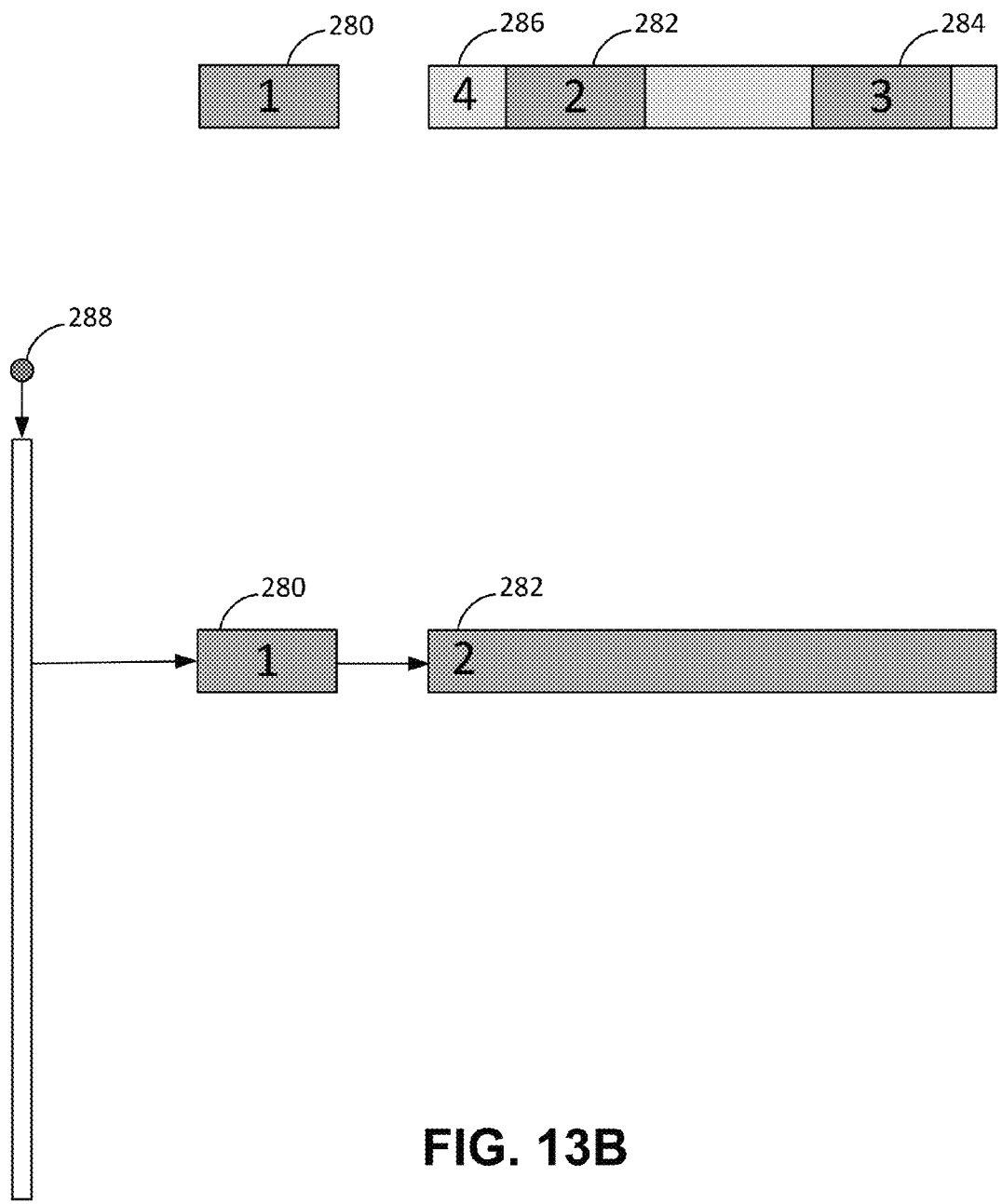

FIGS. 13A-13B illustrate an example of a process related to updating a node corresponding to one scanline to include another scanline, in accordance with the processes of FIGS. 6 and 8. The present example assumes that three scanlines 280, 282, and 284 have been already registered in the scanline table 36, and a scanline 286 is to be added to the scanline table 36. Note that the scanlines 280-286 are also respectively designated in FIGS. 13A and 13B as scanlines "1," "2," "3," and "4" to indicate an order of processing the scanlines 280-286. Further, the example assumes that all of the scanlines 280-286 are associated with the same y-coordinate. As shown in FIGS. 13A-13B, the scanline table 36 has an anchor 288 associated therewith.

The present example assumes that when the scanline 286 comes in for processing, a node corresponding to the scanline 280 is set as a current node. Hence, when the scanline 286 is processed, a determination is made as to whether the scanline 286 is located left of the scanline 280 corresponding to the current node and a gap exists between those two scanlines (see step 154 in FIG. 6). Since the scanline 286 is not located to the left of the scanline 280, next, a determination is made as to whether the scanline 286 is located right of the scanline 280 corresponding to the current node and a gap exists between those two scanlines (see step 156 in FIG. 6).

Since the scanline 286 is located to the right of the scanline 280 corresponding to the current node and a gap exists between those two scanlines, a next node corresponding to the scanline 282 that follows the current node is now set as the current node (see step 162 in FIG. 6). Then, a determination is made as to whether this current node is a last node of a list (see step 164 in FIG. 6). Since it is not, the processing of the scanline 286 returns to determining a position of the scanline 286 with respect to the scanline 282 now corresponding to the current node.

In the present example, the result of this determination is that the scanline 286 is located left of the scanline 282 (a start x-coordinate of the scanline 286 is smaller than a start x-coordinate of the scanline 282) but no gap exists between the scanlines 286 and 282. Accordingly, the process related to updating the current node to include the scanline 286 is executed (see step 160 of FIG. 6).

In this regard, the current node is updated to include the scanline 286 (see step 190, in FIG. 8). More specifically, the scanline 282 corresponding to the current node is updated to include the scanline 286. As such, scanline parameters associated with the current node are updated to include parameters of the scanline 286. Then, a determination is made as to whether a gap exists between scanlines corresponding to the updated current node and a next node that corresponds to the scanline 284 and that follows the updated current node (see step 202 in FIG. 8). As shown in FIG. 13B, no gap exists between the scanline 282 updated to include the scanline 286 and the scanline 284 since they overlap. Accordingly, the updated current node is updated again to include the scanline 284 corresponding to the next node (see step 204 in FIG. 8). Next, the next node corresponding to the scanline 284 is removed from a list and a memory location allocated to the next node is freed up (see steps 206 and 208, in FIG. 8). The process then checks if there is another next node to process that follows the previously processed node that was removed (i.e., the node corresponding to the scanline 284) (see step 210 in FIG. 8). Since no more following nodes exist, the process ends.

Figure 14:
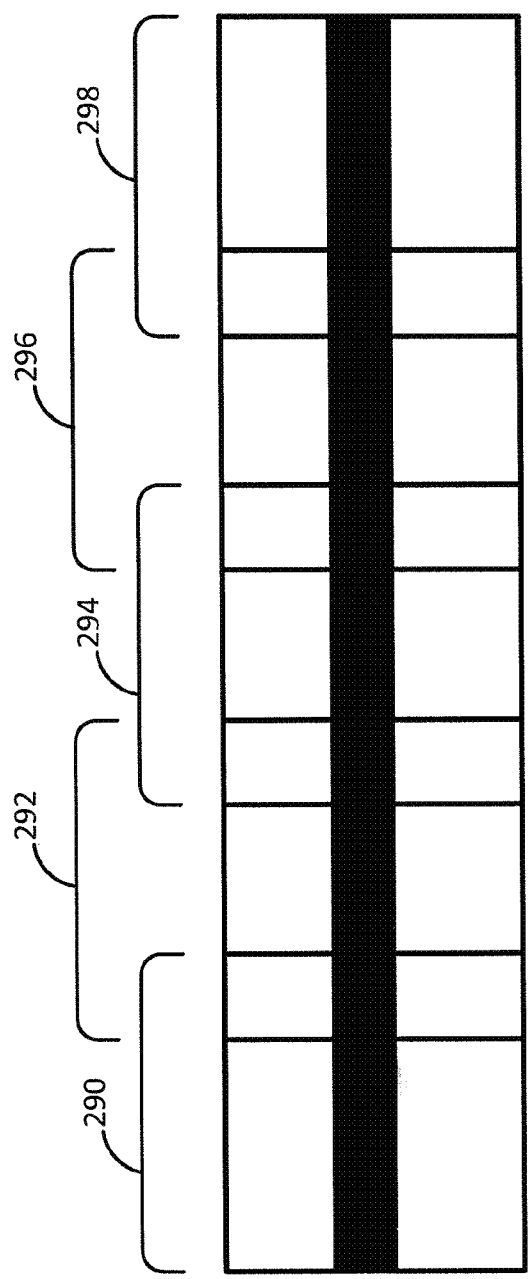
FIG. 14 illustrates an example of multiple image masks that overlap each other.

Further, as described above, various processes of the present disclosure may apply to image mask-type of drawing objects. FIG. 14 illustrates an example of image masks 290-298 that overlap each other. The example of FIG. 14 assumes that an unmasking color of each image mask is 100% transparent, all of the image masks 280-288 have the same masking color, and the masking color of each image mask is opaque.

Figure 15:
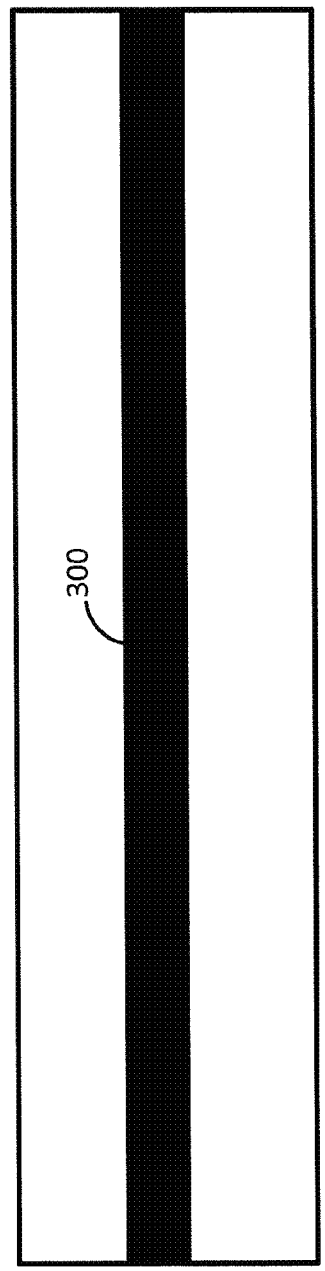
FIG. 15 illustrates a single scanline associated with the multiple image masks of FIG. 14.

In accordance with the principles of the present disclosure, when each of the image masks 290-298 is converted to scanlines, a single scanline 300 can be generated by merging scanlines associated with the individual image masks for each respective y-coordinate along a page, as shown in FIG. 15. Hence, drawing orders to draw scanlines associated with multiple image masks may be generated at the same time instead of generating separate drawing orders to draw each image mask individually. Accordingly, conversion to scanlines can reduce drawing time.

4. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A method, comprising:
receiving, by at least one processor, print data including data representing a plurality of drawing objects including at least a first drawing object and a second drawing object, wherein the first drawing object and the second drawing object are each of one of predetermined object types and meet a predetermined condition;
rendering, by the at least one processor, the first drawing object to a first plurality of scanlines;
rendering, by the at least one processor, the second drawing object to a second plurality of scanlines;
setting a particular memory location of a scanline table to include a first parameter of a first given scanline of the plurality of first scanlines;
determining that the first given scanline overlaps at least partially with a second given scanline of the plurality of second scanlines;
responsive to the determining, updating the particular memory location of the scanline table by replacing the first parameter with a second parameter of the second given scanline, thereby combining parameters of the first and second drawing objects into a single scanline of the scanline table;
using, by the at least one processor, the updated scanline table to generate a single drawing order list for both the first and second drawing objects, based on the first and second plurality of scanlines, without generating separate drawing order lists for the first and second drawing objects; and
using, by the at least one processor, the single drawing order list to produce a print image.

2. The method of claim 1, wherein the drawing order list generated for the first and second drawing objects is a single block order.

3. The method of claim 1, wherein the predetermined condition holds at least that a first color of the first drawing object is the same as a second color of the second drawing object.

4. The method of claim 3, wherein:
a first input color of the first drawing object is the same as a first destination color of the first drawing object, and
a second input color of the second drawing object is the same as a second destination color of the second drawing object.

5. The method of claim 3, wherein:
the first color of the first drawing object includes a first foreground color of the first drawing object, and
the second color of the second drawing object includes a second foreground color of the second drawing object.

6. The method of claim 1, wherein the predetermined object types include a vector object, a text object, and an image mask object.

7. The method of claim 6, wherein the first drawing object is of a first object type and the second drawing object is of a second object type different from the first object type.

8. The method of claim 3, wherein:
the predetermined object types include a vector object,
at least one of the first drawing object or the second drawing object is the vector object, and
the predetermined condition further holds that a color of the vector object is opaque.

9. The method of claim 3, wherein:
the predetermined object types include an image mask object,
at least one of the first drawing object and the second drawing object is the image mask object, and
the predetermined condition further holds that (i) a masking color of the image mask object is opaque, and (ii) an unmasking color of the image mask object is 100% transparent.

10. The method of claim 3, wherein:
the predetermined object types include a text object,
at least one of the first drawing object or the second drawing object is the text object, and
the predetermined condition further holds that (i) a text color of the text object is opaque, and (ii) a text background color of the text object is 100% transparent.

11. The method of claim 1, further comprising:
determining, by the at least one processor, if the first drawing object is one of the predetermined object types;
determining, by the at least one processor, if the second drawing object is one of the predetermined object types; and
determining, by the at least one processor, if the first drawing object and the second drawing object meet the predetermined condition.

12. The method of claim 1, further comprising storing respective parameters associated with the first plurality of scanlines and the second plurality of scanlines in the scanline table, the scanline table comprising a data buffer.

13. The method of claim 1, further comprising:
adding, by the at least one processor, first parameters of the first plurality of scanlines to the scanline table; and
merging, by the at least one processor, second parameters of the second plurality of scanlines with the first parameters of the first plurality of scanlines in the scanline table.

14. The method of claim 1, wherein the first parameter of the first given scanline is a first coordinate of the first given scanline and the second parameter of the second given scanline is a second coordinate of the second given scanline, and wherein updating the particular memory location of the scanline table comprises replacing the first coordinate with the second coordinate.

15. The method of claim 1, wherein:
the first given scanline is associated with a first start coordinate and a first end coordinate along an axis,
the second given scanline is associated with a second start coordinate and a second end coordinate along the axis, and
determining that the first given scanline overlaps at least partially with a second given scanline comprises determining that at least one of the second start coordinate or the second end coordinate is located on the axis between the first start coordinate and the first end coordinate.

16. The method of claim 13, wherein merging the second parameters of the second plurality of scanlines with the first parameters of the first plurality of scanlines in the scanline table includes:
determining that a third given scanline of the second plurality of scanlines does not overlap with one or more scanlines of the first plurality of scanlines; and
based on the determining, adding a respective parameter of the third given scanline to the scanline table without replacing the first parameter.

17. The method of claim 1, wherein the plurality of drawing objects further includes a third drawing object, and wherein the first drawing object, the second drawing object, and the third drawing object are each of one of the predetermined object types and meet the predetermined condition, the method further comprising:
rendering, by the at least one processor, the third drawing object to a third plurality of scanlines;
determining that a third given scanline of the third plurality of scanlines overlaps at least partially with at least one of the first given scanline or the second given scanline;
responsive to the determining, updating the particular memory location of the scanline table by replacing the second parameter with a third parameter of the third given scanline; and
using, by the at least one processor, the updated scanline table to generate, at the same time, the drawing order list for the first, second, and third drawing objects based on the first, second, and third plurality of scanlines.

18. An apparatus, comprising:
at least one processor;
memory; and
program instructions that are stored in the memory and, when executed by the at least one processor, cause the at least one processor to perform functions including:
receiving print data including data representing a plurality of drawing objects including at least a first drawing object and a second drawing object, wherein the first drawing object and the second drawing object are each of one of predetermined object types and meet a predetermined condition,
rendering the first drawing object to a first plurality of scanlines,
rendering the second drawing object to a second plurality of scanlines,
setting a particular memory location of a scanline table to include a first parameter of a first given scanline of the plurality of first scanlines;
determining that the first given scanline overlaps at least partially with a second given scanline of the plurality of second scanlines;
responsive to the determining, updating the particular memory location of the scanline table by replacing the first parameter with a second parameter of the second given scanline, thereby combining parameters of the first and second drawing objects into a single scanline of the scanline table;
using the updated scanline table to generate a single drawing order list for both the first and second drawing objects, based on the first and second plurality of scanlines, without generating separate drawing order lists for the first and second drawing objects; and
using the single drawing order list to produce a print image.

19. The apparatus of claim 18, wherein the functions further include:
(i) adding first parameters of the first plurality of scanlines to the scanline table, and
(ii) merging second parameters of the second plurality of scanlines with the first parameters of the first plurality of scanlines in the scanline table.

20. A non-transitory computer-readable medium having stored thereon program instructions that, when executed by at least one processor, cause the at least one processor to:
receive print data including data representing a plurality of drawing objects including at least a first drawing object and a second drawing object, wherein the first drawing object and the second drawing object are each of one of predetermined object types and meet a predetermined condition;
render the first drawing object to a first plurality of scanlines;
render the second drawing object to a second plurality of scanlines;
set a particular memory location of a scanline table to include a first parameter of a first given scanline of the plurality of first scanlines;
determine that the first given scanline overlaps at least partially with a second given scanline of the plurality of second scanlines;
responsive to the determining, update the particular memory location of the scanline table by replacing the first parameter with a second parameter of the second given scanline, thereby combining parameters of the first and second drawing objects into a single scanline of the scanline table;
use the updated scanline table to generate a single drawing order list for both the first and second drawing objects, based on the first and second plurality of scanlines, without generating separate drawing order lists for the first and second drawing objects; and
use the single drawing order list to produce a print image.

21. The method of claim 16, wherein:
the one or more scanlines of the first plurality of scanlines are associated with respective pairs of first start coordinates and first end coordinates along an axis,
the third given scanline is associated with a third start coordinate and a third end coordinate along the axis, and
determining that the third given scanline of the second plurality of scanlines does not overlap with the one or more scanlines of the first plurality of scanlines comprises determining, for each respective pair of first start coordinates and first end coordinates, that the third start coordinate and the third end coordinate are located entirely to one side of the respective pair of first start coordinates and first end coordinates.

* * * * *